US011859447B2

(12) United States Patent

Brown, II et al.

(10) Patent No.: US 11,859,447 B2
(45) Date of Patent: Jan. 2, 2024

(54) WINDOW COVERING SYSTEM

(71) Applicant: ROLLEASE ACMEDA, INC., Stamford, CT (US)

(72) Inventors: Thomas J. Brown, II, Casco, ME (US); Douglas Moore, Lisbon Falls, ME (US); Roccardo Santilli, Reservoir (AU)

(73) Assignee: ROLLEASE ACMEDA, INC., Stamford, CT (US)

(*) Notice: Subject to any disclaimer, the term of this patent is extended or adjusted under 35 U.S.C. 154(b) by 157 days.

(21) Appl. No.: 16/301,018

(22) PCT Filed: May 11, 2017

(86) PCT No.: PCT/US2017/032216
§ 371 (c)(1),
(2) Date: Nov. 13, 2018

(87) PCT Pub. No.: WO2017/197152
PCT Pub. Date: Nov. 16, 2017

(65) Prior Publication Data
US 2019/0178030 A1 Jun. 13, 2019

Related U.S. Application Data

(60) Provisional application No. 62/335,337, filed on May 12, 2016.

(51) Int. Cl.
*E06B 9/44* (2006.01)
*E06B 9/50* (2006.01)
(Continued)

(52) U.S. Cl.
CPC .................. *E06B 9/44* (2013.01); *E06B 9/06* (2013.01); *E06B 9/40* (2013.01); *E06B 9/50* (2013.01)

(58) Field of Classification Search
CPC ..... E06B 9/40; E06B 9/42; E06B 9/44; E06B 9/50; E06B 9/60; E06B 9/78
See application file for complete search history.

(56) References Cited

U.S. PATENT DOCUMENTS 4,372,367 A * 2/1983 Baldanello ................ E06B 9/74 160/310
4,647,488 A * 3/1987 Schnebly ................ E06B 9/327 428/116

(Continued)

FOREIGN PATENT DOCUMENTS

DE 10244033 A1 3/2004
GB 2338740 A 12/1999

*Primary Examiner* — Abe Massad
*Assistant Examiner* — Matthew R. Shepherd
(74) *Attorney, Agent, or Firm* — Hunton Andrews Kurth LLP

(57) ABSTRACT

A window covering system that includes an elongated tube configured for a window covering to be wound around the tube, a clutch assembly that includes a pulley and a power spring having a first end engaging the pulley and a second end that is stationary, a limiter assembly, a booster assembly arranged between the clutch assembly and the limiter assembly, a cord arranged at least partially within the clutch assembly, and a wand fixed to the cord to selectively raise and lower the window covering.

15 Claims, 29 Drawing Sheets

(51) Int. Cl.
*E06B 9/40* (2006.01)
*E06B 9/06* (2006.01)

(56) References Cited

U.S. PATENT DOCUMENTS

| | | | | |
|---|---|---|---|---|
| 4,865,109 | A * | 9/1989 | Sherman | E06B 9/78 160/321 |
| 8,662,139 | B2 * | 3/2014 | Anthony | E06B 9/56 160/293.1 |
| 8,844,605 | B2 * | 9/2014 | Ng | E06B 9/42 160/319 |
| 9,341,021 | B2 * | 5/2016 | Lu | E06B 9/17007 |
| 2004/0231804 | A1 * | 11/2004 | Ward | E06B 9/32 160/89 |
| 2006/0272783 | A1 * | 12/2006 | Smith | E06B 9/262 160/121.1 |
| 2009/0242332 | A1 | 10/2009 | Anderson et al. | |
| 2009/0308547 | A1 * | 12/2009 | Kwak | E06B 9/42 160/368.1 |
| 2012/0048485 | A1 | 3/2012 | Fu-Lai et al. | |
| 2012/0266413 | A1 * | 10/2012 | Kao | E06B 9/42 16/96 D |
| 2013/0037225 | A1 * | 2/2013 | Huang | E06B 9/60 160/313 |
| 2013/0153159 | A1 | 6/2013 | Anderson et al. | |
| 2013/0199735 | A1 * | 8/2013 | Colson | E06B 9/42 160/2 |
| 2013/0220561 | A1 | 8/2013 | Yu et al. | |
| 2014/0069596 | A1 | 3/2014 | Ng | |
| 2015/0007946 | A1 * | 1/2015 | Yu | E06B 9/30 160/84.02 |
| 2015/0191973 | A1 * | 7/2015 | Bohlen | E06B 9/78 160/291 |

* cited by examiner

FIGURE 40A
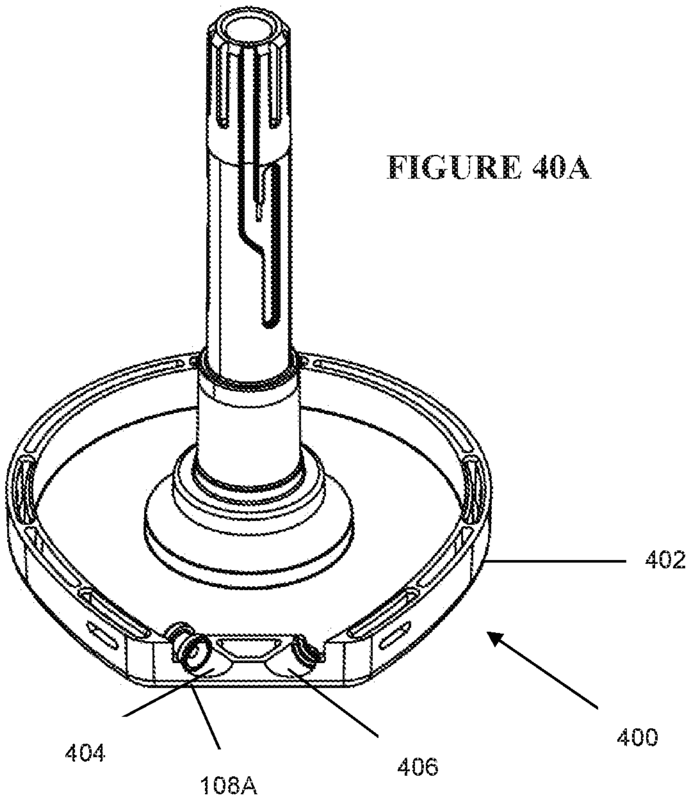
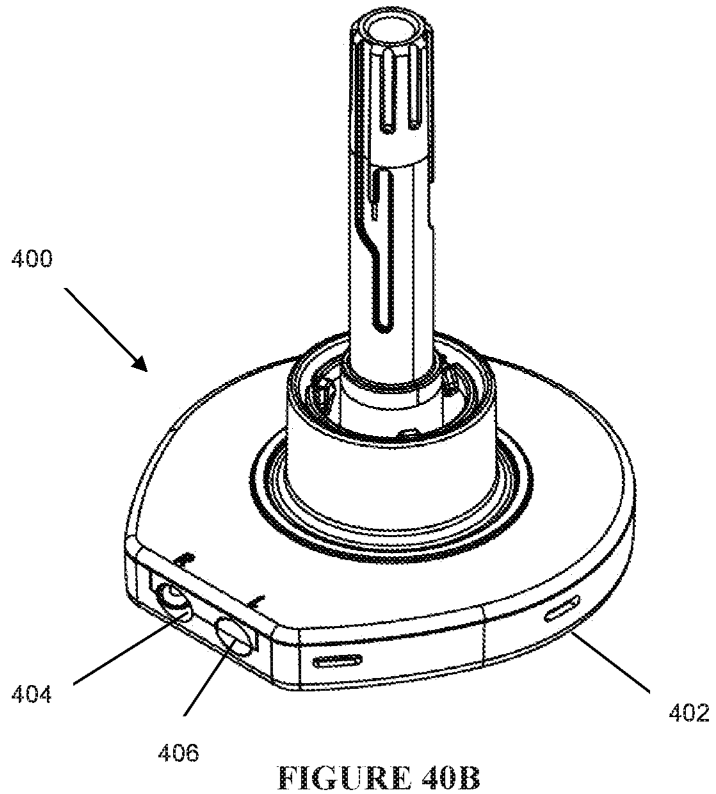
FIGURE 40B

WINDOW COVERING SYSTEM

CROSS-REFERENCE TO RELATED APPLICATION

The present application is a national phase application based on International Patent Application No. PCT/US2017/032216 filed May 11, 2017, which claims priority to U.S. provisional application Ser. No. 62/335,337 filed May 12, 2016, the disclosure of which both are incorporated herein by reference in their entirety.

FIELD OF THE INVENTION

The present invention relates generally to window treatments. Particular embodiments relate to a mechanism that includes a short cord to control movement of a window dressing.

BACKGROUND OF THE INVENTION

Generally, window treatment systems for covering windows and/or for decorative purposes that can be used, for example, by residential, commercial, and industrial consumers are known. Some examples of these systems include window blinds, venetian blinds, roman shades, and vertical blinds. A typical system for covering a window can include a window covering element, a mechanism for raising, lowering, or otherwise opening or closing the window covering element and one or more cords configured to control the mechanism.

The cord may be, for example, a string, a rope, or a continuous chain (e.g., comprised of plastic or metal beads). Commonly, cords that are included in window treatment systems form a closed loop that may be openly accessible, for example, to children and pets and may cause injuries if used incorrectly.

To address this problem, various systems have been developed. For example, electronic systems have been designed that eliminate the need for a cord. However, such electronic systems are expensive and can be complicated to control.

SUMMARY OF THE INVENTION

The present disclosure is directed to a system configured to control the raising and lowering and/or opening and closing of a window covering reliably and easily using a very short length cord positioned out of reach of a child, a pet or the like in order to eliminate potential danger to them.

In an embodiment, the present disclosure is directed to a window treatment system that includes an elongated tube around which a window covering can be wound, a clutch assembly including a pulley and a power spring having a first end engaging the pulley and a second end that is stationary, a booster assembly, a cord arranged at least partially within the clutch assembly, and a wand fixed to the cord to selectively raise and lower the window covering.

In an embodiment, the clutch assembly includes a guard that, in an assembled state, with the pulley forms at least one cavity and in the cavity the cord and the power spring are arranged.

In an embodiment, the guard includes at least one opening, and the clutch assembly further includes an eyelet disposed within the opening and the cord is configured to extend through the eyelet and the opening.

In an embodiment, the eyelet is made of a smooth, highly polished material such as ceramic to reduce friction between the eyelet and the cord as the cord moves between an extended position and a retracted position.

In an embodiment, the cavity between the guard and the pulley defines a path for movement of the cord between a retracted position and an extended position through the eyelet, the path being sized and shaped to reduce wear on the cord during movement thereof.

In an embodiment, the guard and the pulley define a path of movement for the cord through the eyelet that is angled to reduce wear on the cord.

In an embodiment, the eyelet is angled within the opening of the guard so that the eyelet is positioned in an orientation selected to reduce wear on the cord.

In an embodiment, the guard has a bottom wall that includes a first opening and a second opening, and the clutch assembly further includes a first eyelet disposed in the first opening and a second eyelet disposed in the second opening with the cord extending through the first eyelet when the window covering system is configured for right-handed operation and the cord extending through the second eyelet when the window covering system is configured for left-handed operation. Alternatively, one of the eyelets can be replaced by a blanking plug.

In an embodiment, the booster assembly includes a main pre-tensioned spring configured to provide a force for movement of the window covering between a retracted position and an extended position. The clutch assembly may include an aperture at an outer end, to provide access to a tensioning component engaged with the main spring, such that the tension of the main spring may be adjusted by adjusting a position of the tensioning component.

In an embodiment, the system may include a limiter assembly. The limiter assembly may be configured to be set at least a first position for the window covering that represents a fully retracted position of the window covering.

In an embodiment, the limiter assembly further comprises a stop to prevent the window covering from further raising once it reaches a predetermined upper position.

In an embodiment, the limiter assembly further comprises further comprising a wheel coupled to and rotatable with the window covering, wherein the stop is a threaded screw with a stop and the wheel travels axially along the screw as the screw is rotated until the travelling wheel reaches and abuts the stop when the window covering reaches a predetermined upper position.

In an embodiment, the limiter assembly further comprises an engaging means to manually define the predetermined upper position.

In an embodiment, wherein the engaging means is a thumb wheel coupled to the threaded screw for manually defining the predetermined upper position by selectively turning the screw.

In an embodiment, the present disclosure is directed to a limiter assembly that may include a retractable pin to engage a mounting bracket. The retractable pin may be biased outwardly, such that when installing the blind, the pin can be compressed inward to allow the installer to position the limiter assembly with respect to the mounting bracket. When released, the biasing force forces the pin outward to engage the mounting bracket and secure the window treatment system.

BRIEF DESCRIPTION OF THE DRAWINGS

FIGS. 40A-40B show details of another embodiment of a clutch assembly that includes a cord guard assembly.

DETAILED DESCRIPTION OF EMBODIMENTS OF THE INVENTION

Figure 1:
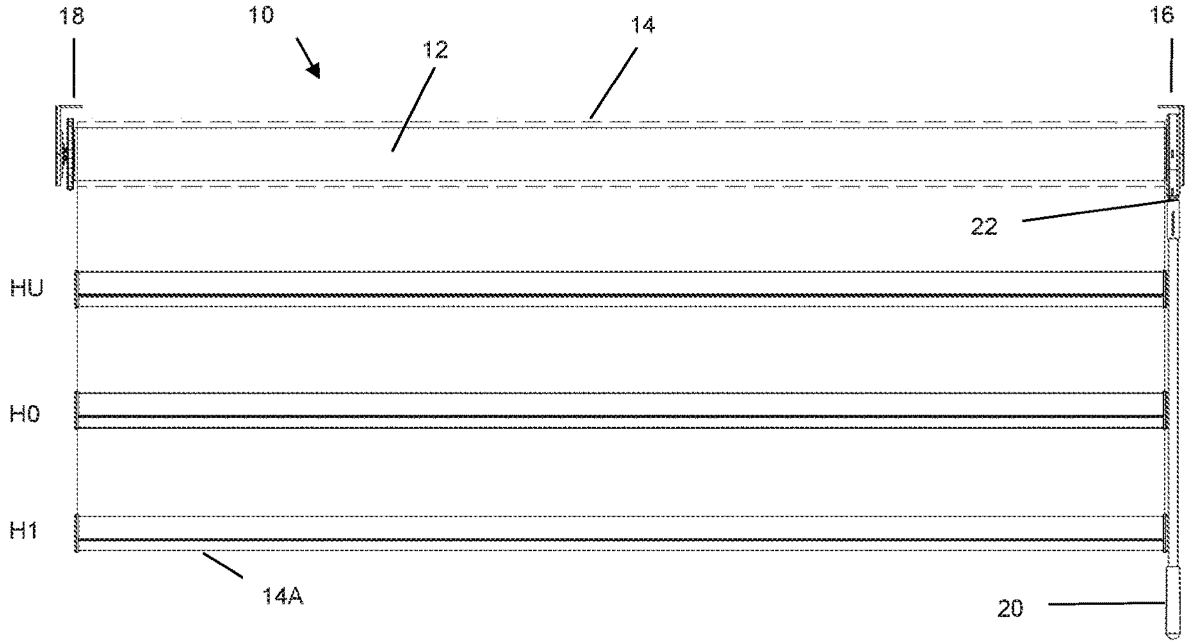
FIG. 1 shows a side view of an embodiment of a window treatment system incorporating the present invention.

With reference now to the drawings, embodiments of a window treatment system of the present disclosure, which is generally designated by the reference numeral 10, will be described. It should be noted that these drawings have been drawn to scale and as such show the relative sizes of the window covering system 10.

Referring first to FIG. 1, the window covering system 10 includes a tube 12 with a window covering 14, such as a window shade, that is wrapped around the tube 12 in a conventional manner. The system 10 is delimited and supported by a first end bracket 16 and a second end bracket 18 between an opening, such as a window or a doorway (not shown). Optionally, the first end bracket 16 and the second end bracket 18 may be each covered by a bracket cover 17.

Figure 2:
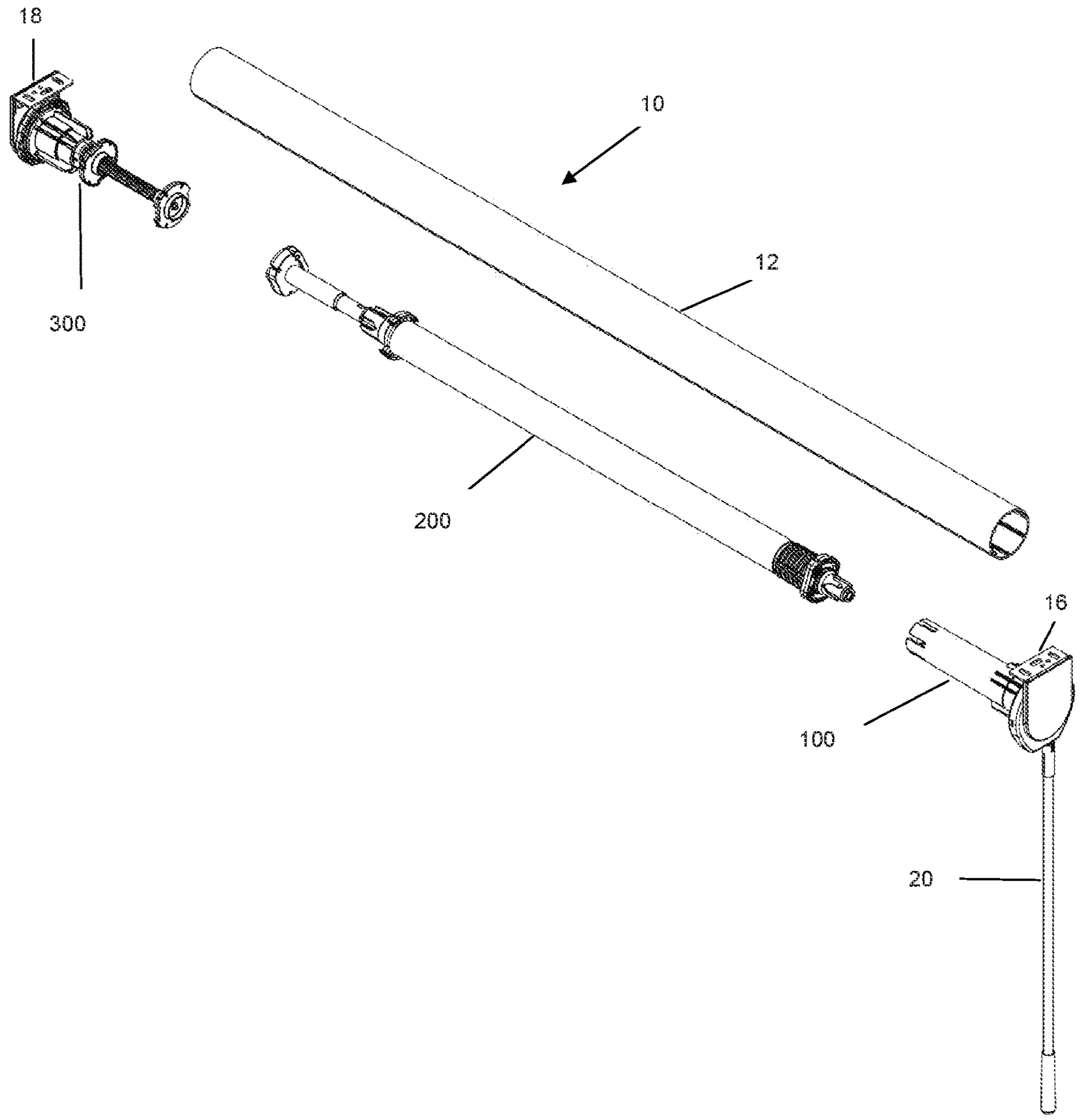
FIG. 2 shows an exploded view of the window treatment system of FIG. 1.

As shown in FIG. 2, the window covering system 10 further includes a clutch assembly 100, a booster assembly 200 and a limiter assembly 300. These assemblies 100, 200, 300 are sized so that, except for components at the ends of the clutch and limiter assemblies 100, 300, the assemblies 100, 200, 300 can be arranged within the tube 12 and hidden from view.

A wand 20 is disposed near the first end bracket 16 and attached to a cord 22 to aid in selectively moving the cord 22 between a retracted position and an extended position. By moving the cord 22 between a retracted position and an extended position, the window covering 14 can be selectively lowered or raised to a desired height between a fully extended position dictated by the overall length of the window covering 14 and a fully retracted position, which is set during installation of the window covering system 10 by the limiter assembly 300. At any given time, the window covering 14 is locked at the preselected height by the booster assembly 200 and the window covering 14 does not go up or down except under the control of an operator.

FIG. 1 shows the window covering 14 at three positions: HU, H0 and H1. There are two ways to raise or lower the shade. For example, the window covering 14 can be lowered from a first position H0 to a second position H1 (see FIG. 1) by grabbing the wand 20 and pulling the wand 20 downward repeatedly, until the window covering 14 reaches the second position H1. The cord 22 is spring loaded (as described below). As the wand 20 is pulled downwardly, the wand 20 pulls at least a portion of the cord 22 out of the clutch assembly 100 causing the booster assembly 200 and tube 12 to rotate and allow movement of the window covering 14. Simultaneously, a coil spring 216 arranged within the booster assembly 200 is tightened as well. Once a desired position of the window covering 14 is reached, the force on the wand 20 (and cord 22) is released. The cord 22 and the wand 20 are pulled upwardly toward the clutch assembly 100 until the end of the wand 20 fixed to the end of the cord 22 contacts the clutch assembly 100 such that the clutch assembly 100 acts as a stop for the movement of the cord 22 and wand 20. Because the cord 22 is relatively short, preferably the operator can pull on the wand 20 repeatedly until the window treatment is lowered to the desired position. Each time a downward force on the wand 20 is released, the booster assembly 200 automatically locks the tube 12 and shade 14 in place.

To raise the window covering 14 from an extended position, the wand 20 can be pulled downwardly slightly and then released, causing the cord 22 and the clutch assembly 100 to release the window covering 14. A main coil spring 216 of the booster assembly 200 applies a rotational force on the tube 12 causing the tube 12 to rotate and in turn raise the window covering. Damping forces are applied within the booster assembly 200 to ensure that the upward motion of the window dressing 14 is a controlled, relatively slow and linear in motion. As such, the booster assembly 200 performs two functions: (1) it provides a force necessary to raise the window covering 14 and (2) it acts as a speed governor by controlling the speed at which the window covering 14 rises when released from a resting state. It is noted that if no action is taken by an operator when the window covering 14 is being raised toward an upper limit HU, the window covering 14 will continue to rise until it reaches the upper limit HU as set and defined by the limiter assembly 300.

Alternatively, instead of using the wand 20, an operator can grab a lower end 14A of the window dressing 14 and manually pull the window covering 14 from the first position H0 to the second position H1. When the window covering 14 is manually raised and/or lowered by pulling directly on the window dressing 14, the cord 22 is disassociated from the booster assembly 200 by the clutch assembly 100 and remains in place together with the wand 20, as explained below.

To manually raise the window covering 14, an operator can pull downwardly slightly and then release the lower end 14A of the window covering 14, causing the booster assembly 200 to be unlocked and thereby allowing the booster assembly 200 to cause rotation of the tube 12, and in turn, raise the window covering 14 toward the upper position HU.

Figure 3:
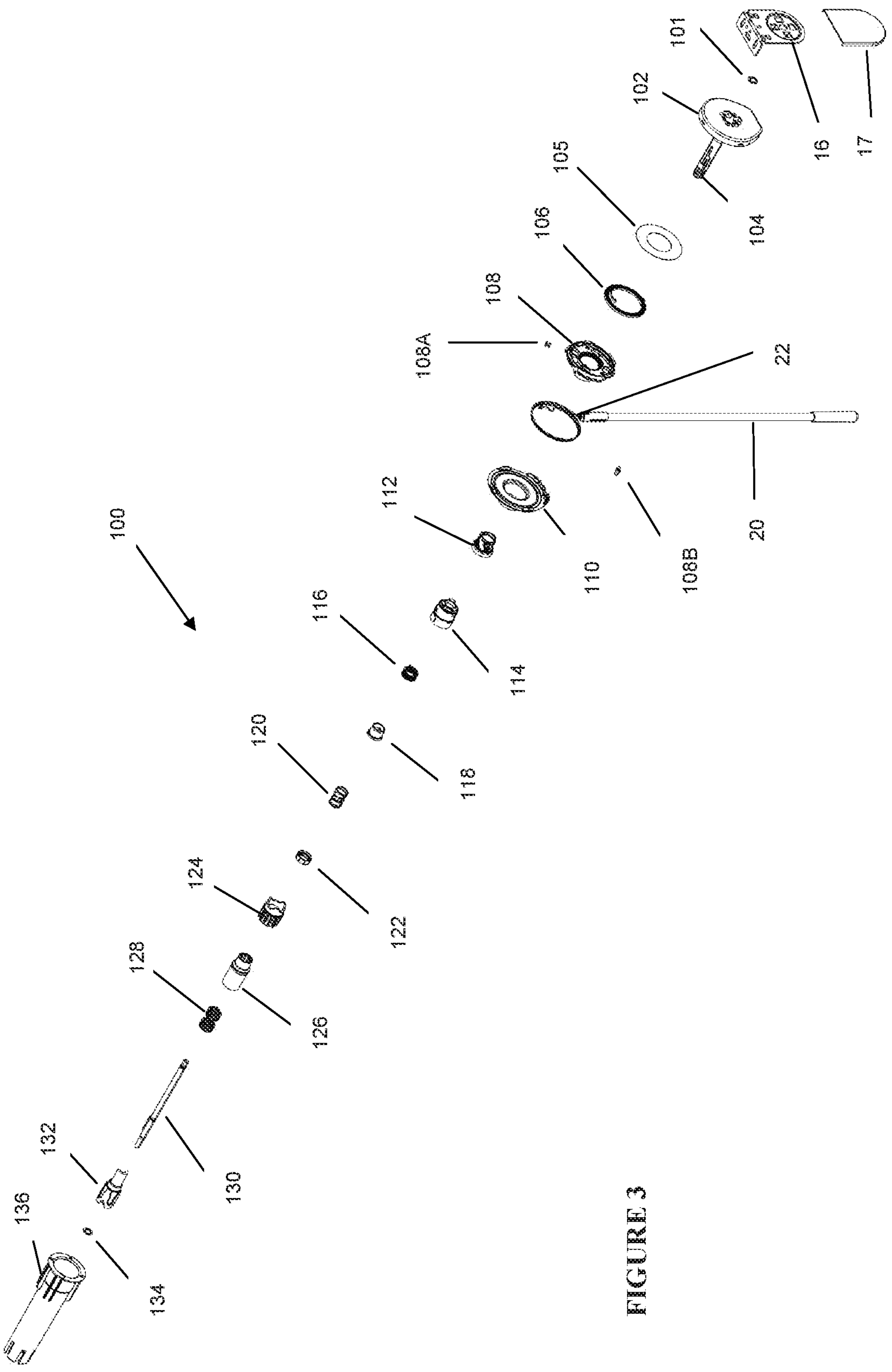
FIG. 3 shows an exploded view of a clutch assembly of the window treatment system of FIG. 1.

As shown in FIG. 3, the clutch assembly 100 includes: the first end bracket 16 and the bracket cover 17; a self-locking ring 101; a cord guard 102 with a boss 104; a washer 105; a concentric power spring 106; a pulley 108; an eyelet 108A; a cord guard cover 110; a clutch sleeve 112; a cam drive dog 114; a clutch spring 116; a clutch spring bushing 118; a compression spring 120; a compression spring retainer 122; a crown 124; a clutch cover 126; two clutch springs 128; an adjusting shaft 130; a clutch inner member 132; a self-locking ring 134; and a connector drive 136. Optionally, the clutch assembly 100 may also include a blanking plug 108B. A similar clutch is described in more detail in International Application No. PCT/AU2016/00053, the contents of which are incorporated herein by reference, with the difference being that the embodiment of the present clutch is adapted for use with a cord and wand rather than a looped cord as described in International Application No. PCT/AU2016/000053.

Figure 13:
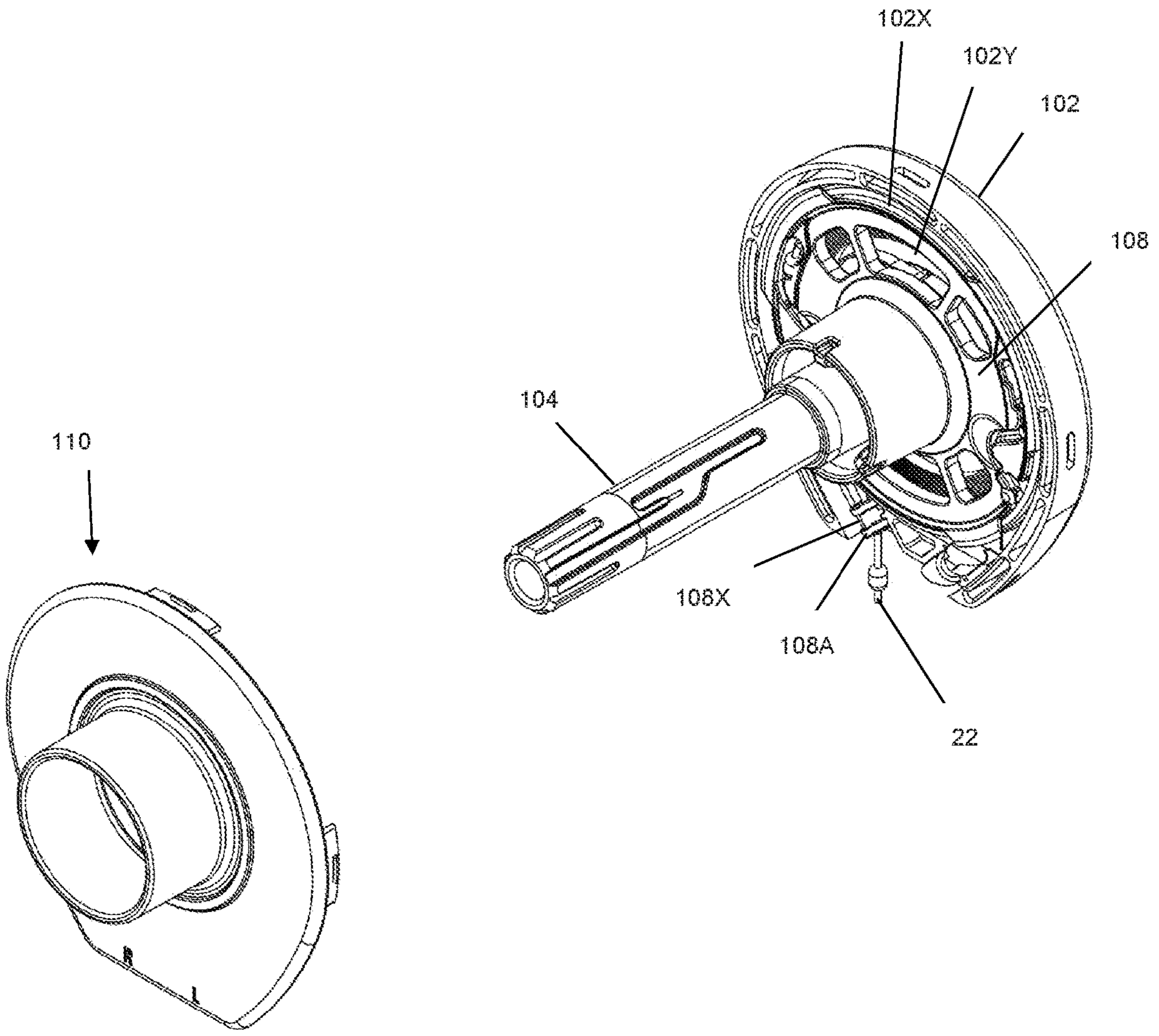
FIG. 13 shows an assembly view of the clutch assembly.
Figure 14:
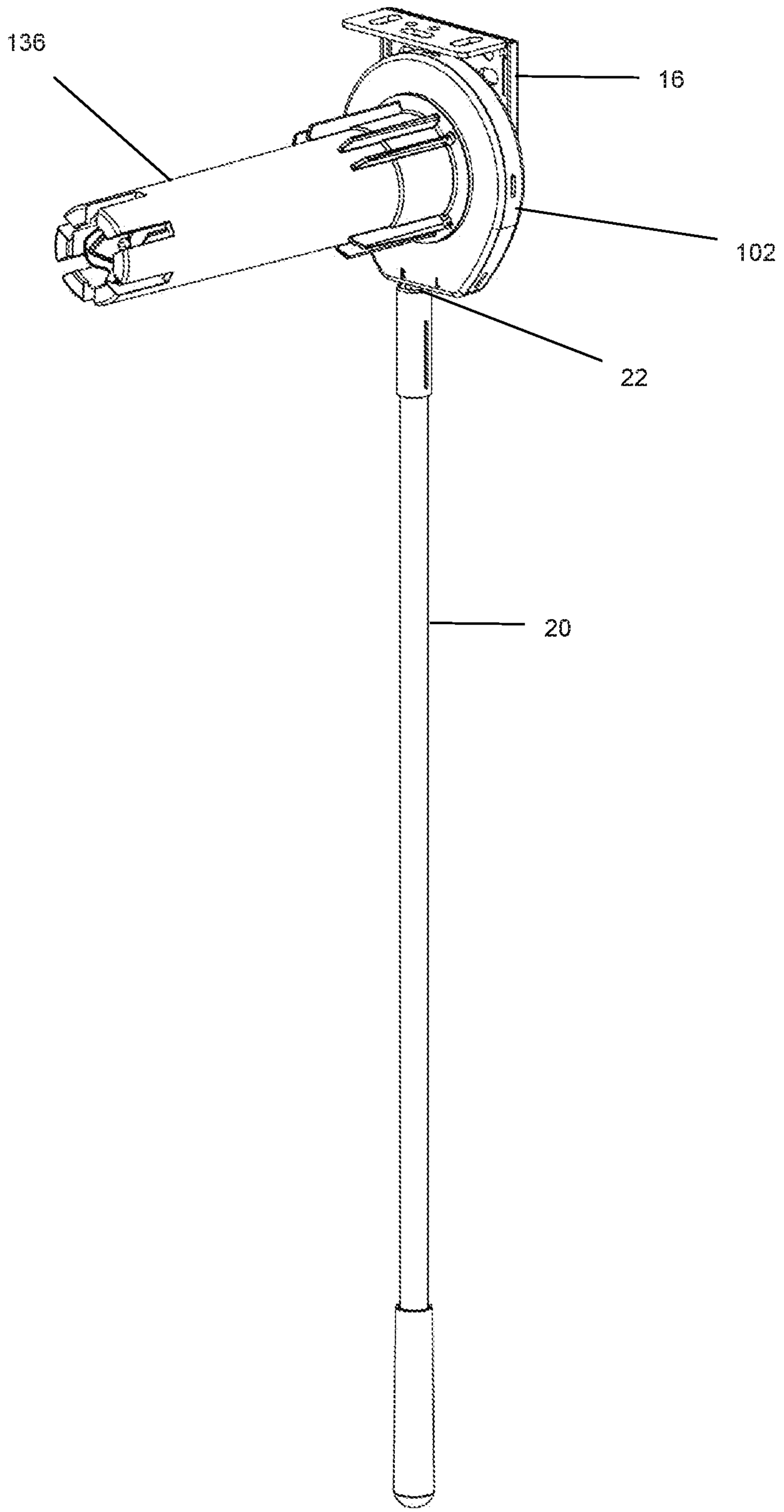
FIG. 14 shows a perspective view of the clutch assembly.

FIGS. 4-12 show details of the components comprising a clutch assembly 100 and how these components interact with each other to provide the described functions. As can be seen in FIG. 14, in an assembled state, the clutch assembly 100 is compact, requiring little space. The pulley 108 and guard 102 form a first cavity 102X (See FIG. 13) therebetween in order to house cord 22 (when it is wound) and a second cavity 102Y for holding power spring 106.

Figure 11A:
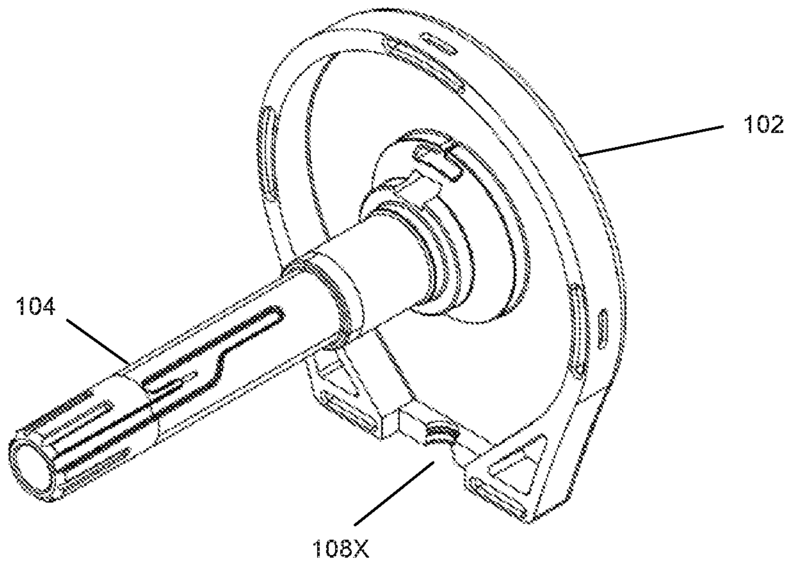

As also shown in FIG. 11A, guard 102 has an opening 108X in which an eyelet 108A (shown in FIG. 9) can be arranged through which the cord 22 can extend in order to prolong the life of the cord 22 by preventing the cord 22 from being damaged (e.g., frayed, cut, etc.). In an embodiment, the eyelet 108A is made of a long-lasting, low friction material such as ceramic or a similar material. As described below, the cord 22 is reciprocated up and down through the eyelet 108A and may be frequently at an angle such that the cord 22 rubs against an inner surface of the eyelet 108A. The eyelet is made of a low-friction material to prolong the life of the cord. FIG. 11 illustrates an embodiment with a single eyelet 108A. FIGS. 40A-B show another embodiment with eyelets 108A disposed in respective holes 404, 406. This embodiment is described in more detail below. As discussed above, the system 100 can be configured for right-handed or left-handed operation.

Figure 6:
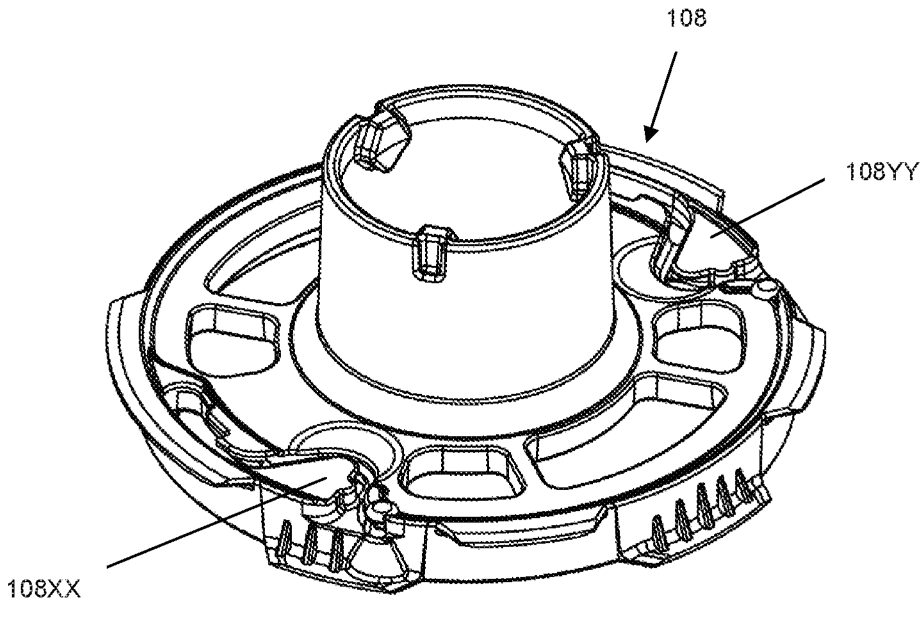
Figure 7:
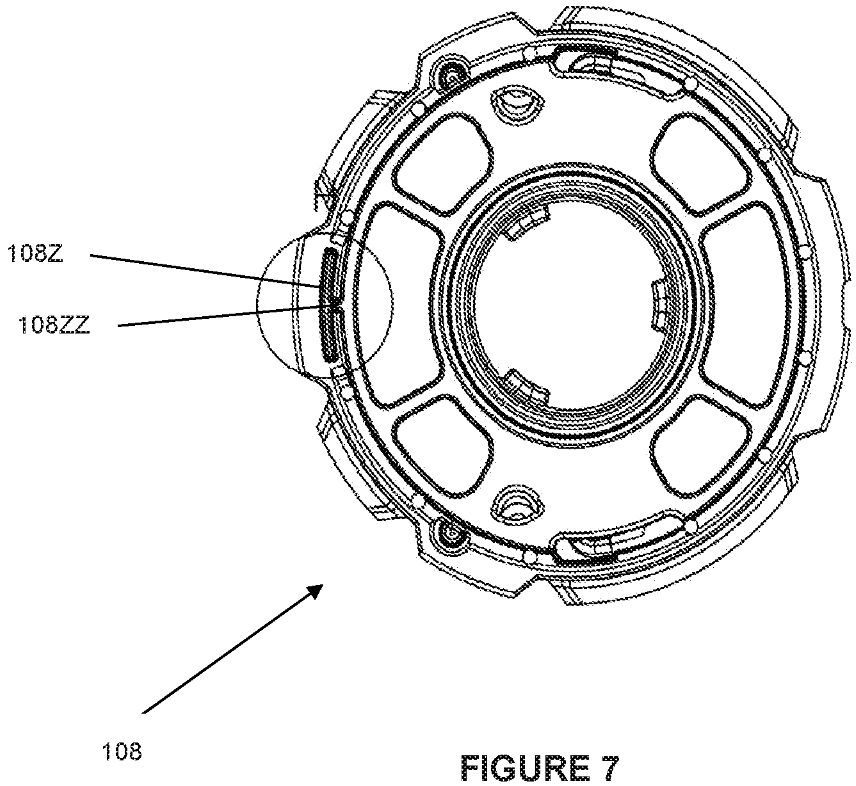
Figure 8:
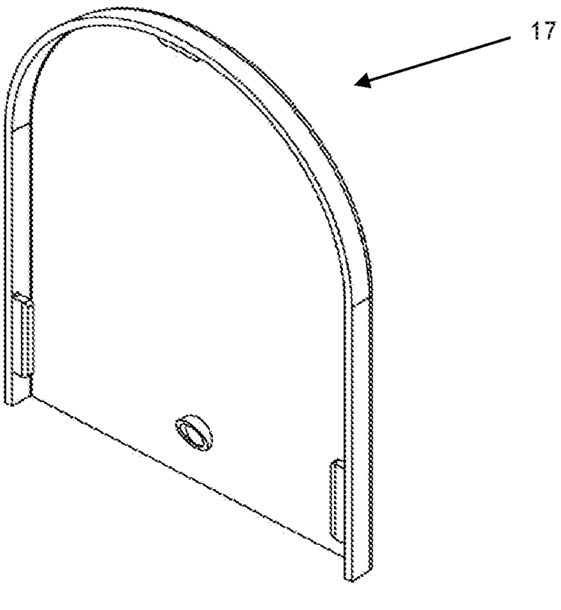
Figure 9:
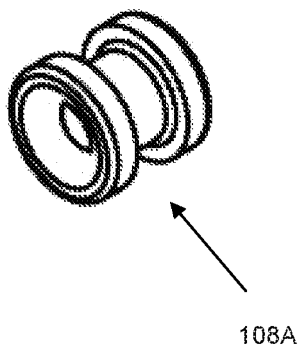
Figure 10:
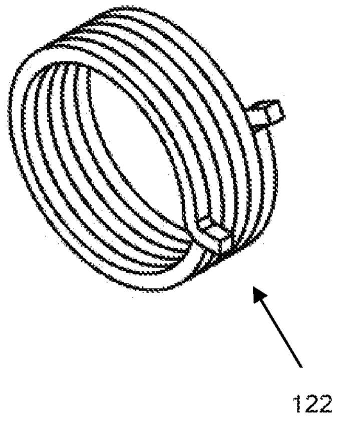
Figure 11B:
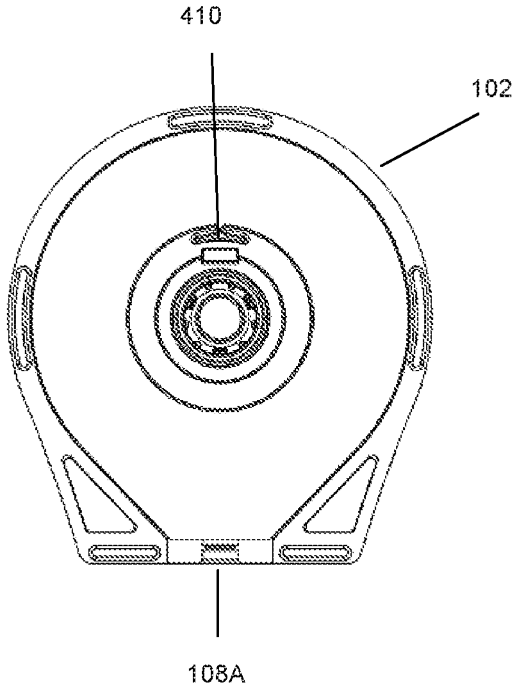
Figure 12A:
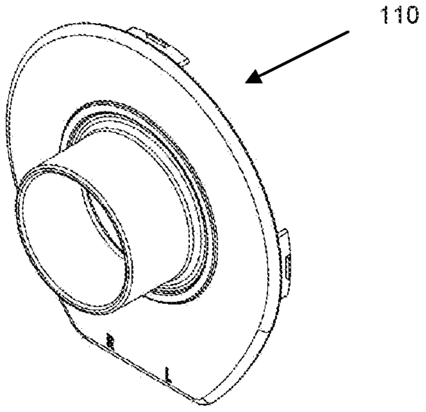
Figure 12B:
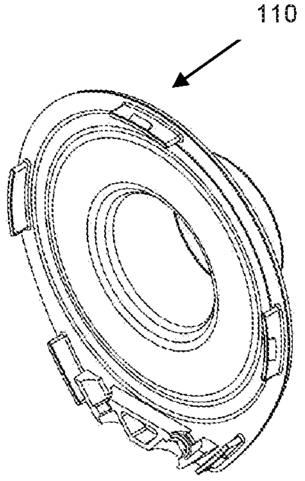

Details of the pulley 108 are shown in FIGS. 6-7. As can be seen, the pulley 108 includes a first opening 108XX and a second opening 108YY with one opening being used for the left-handed operation and the other being used for the right-handed operation. The cord 22 is wound on the outer perimeter of the pulley 108 and is terminated with a knot (not shown). The knot is configured to fit into either of the first opening 108XX or the second opening 108YY. The guard 102 is shown in FIG. 11B and it not only protects the elements of the clutch mechanism but also forms a smooth path for the cord 22 from one of the openings 108XX, 108YY to eyelet 108A.

As mentioned above, as the cord 22 is pulled down by wand 20, the cord 22 causes the pulley 108 to turn. This rotation of the pulley also tightens power spring 106.

Figure 4:
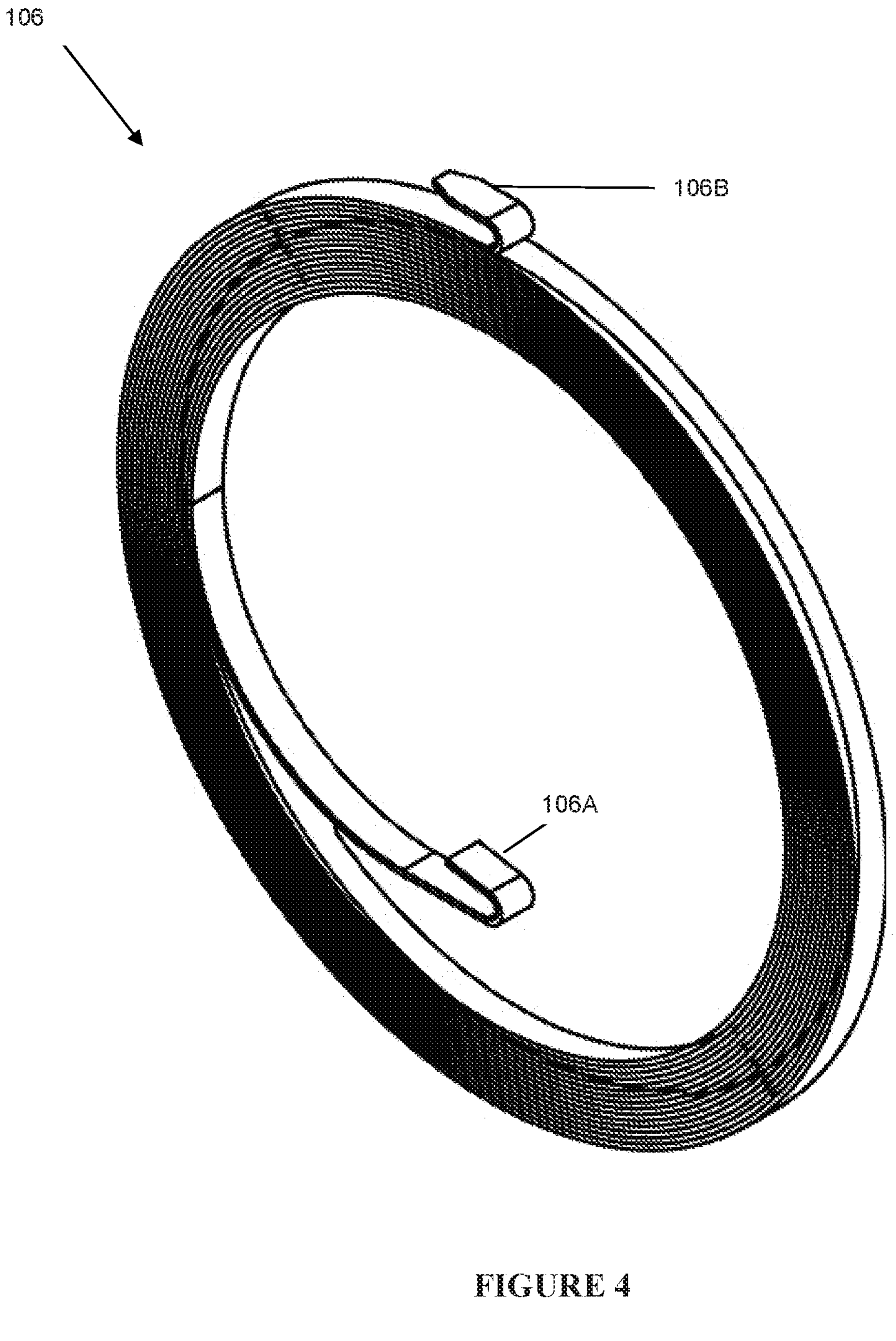
FIGS. 4-12 show details of components of the clutch assembly.
Figure 5:
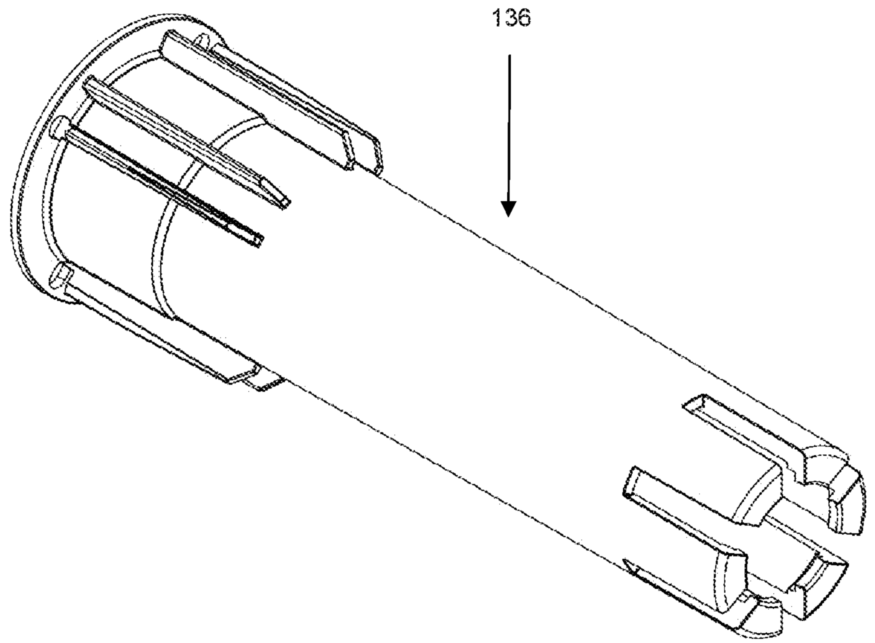

Importantly, as shown in FIG. 4, the power spring 106 is narrow. It is made of a high quality type 301 steel. In one embodiment, it has a thickness of about 0.011 in, a width of about 0.080 in and a length of about 80.5 inches. It can generate a torque of about 0.60 lbf.in.

The power spring 106 is terminated in two respective U-shaped tabs 106*a* and 106*b*. Each tab is about 0.150 in length and has a radius of curvature of about 0.025 in. As shown in FIG. 7, pulley 108 is formed with a curved circumferential slot 108Z accessible through a radial channel 108ZZ. As can be seen from FIG. 7, the slot 108Z extends on either size of channel 108ZZ. The channel 108ZZ and slot 108Z are sized and shaped to receive tab 106*b* of power spring 106 with the power spring 106 being wound either clockwise or counterclockwise, depending on whether a right-handed or left-handed operation is used. The pulley 108 is shaped to form a circular housing for the power spring 106, thereby insuring the overall axial dimension of the clutch is as small as possible.

The other tab 106*a* of power spring 106 fits into slot 410 formed on the internal surface of guard 102, as shown in FIG. 11B.

When the wand 20 is pulled down, the pulley 108 is turned by cord 22 and the clutch mechanism is engaged. Since the guard 102 is stationary, as the pulley 108 is rotated by cord 22, it winds the power spring 106 as cord 22 is pulled down. Once the downward force on the wand 20 is removed, the clutch mechanism is disengaged and the wound power spring 106 rotates the pulley 108 in the opposite direction thereby pulling the cord 22 up and winding it on the pulley 108 until the end of wand 20 proximal to the cord guard 102 comes in contact with the clutch assembly, which acts as a stop.

Figure 15:
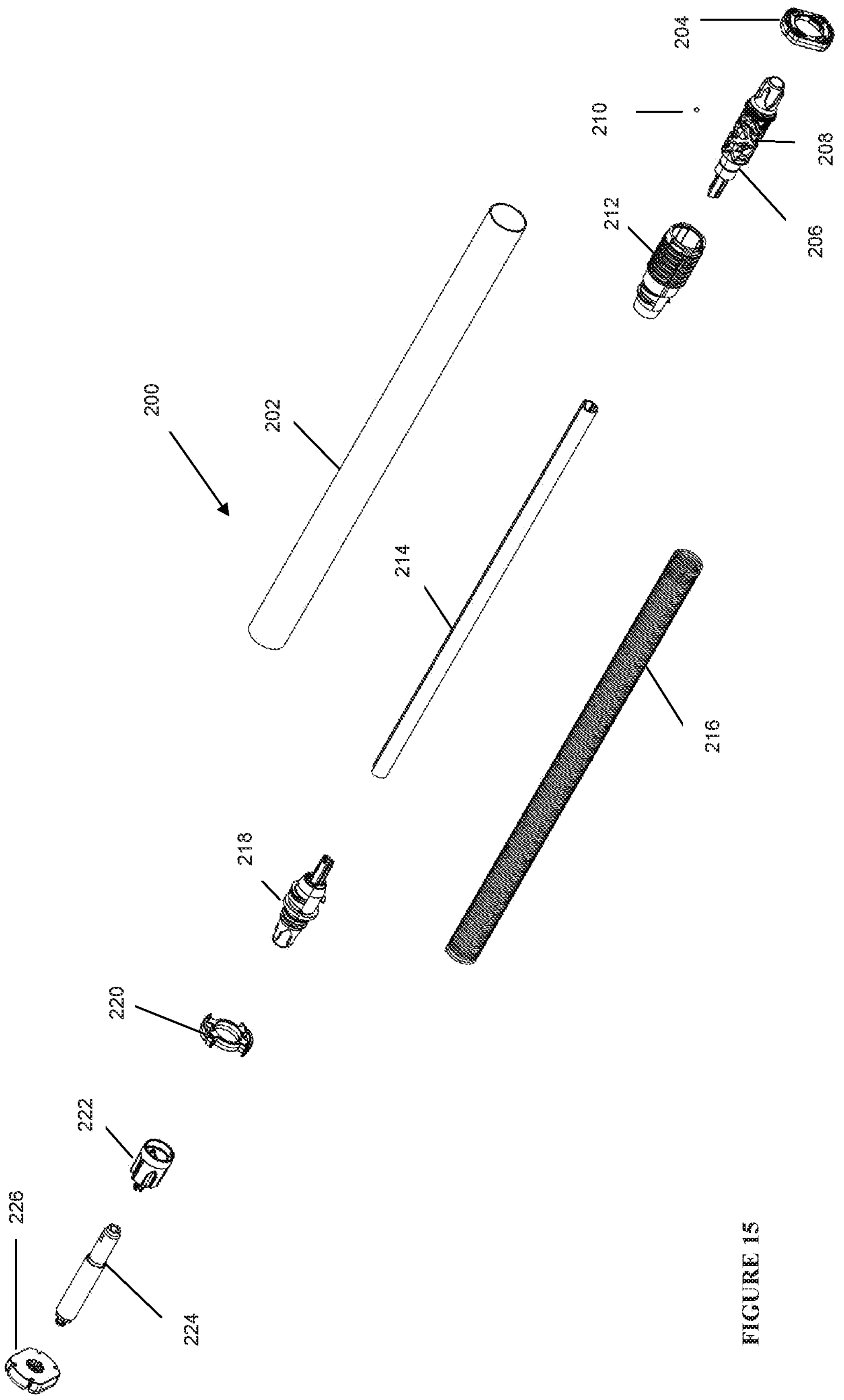
FIG. 15 shows an exploded view of a booster assembly of the window treatment system of FIG. 1.

As shown in FIG. 15, the booster assembly 200 includes: a booster outer sleeve 202; a barrel cam tube adapter 204; a position stop track member 206 with a plurality of tracks 208; a ball bearing 210 running in tracks 208 on the stop track member 206; a position stop jacket 212; a shaft 214 shorter than sleeve 202; a booster spring 216; a free head 218; a booster idler tube adaptor 220; a booster/decelerator adapter 222; a brake or damper 224; and a decelerator adapter 226.

Figure 16:
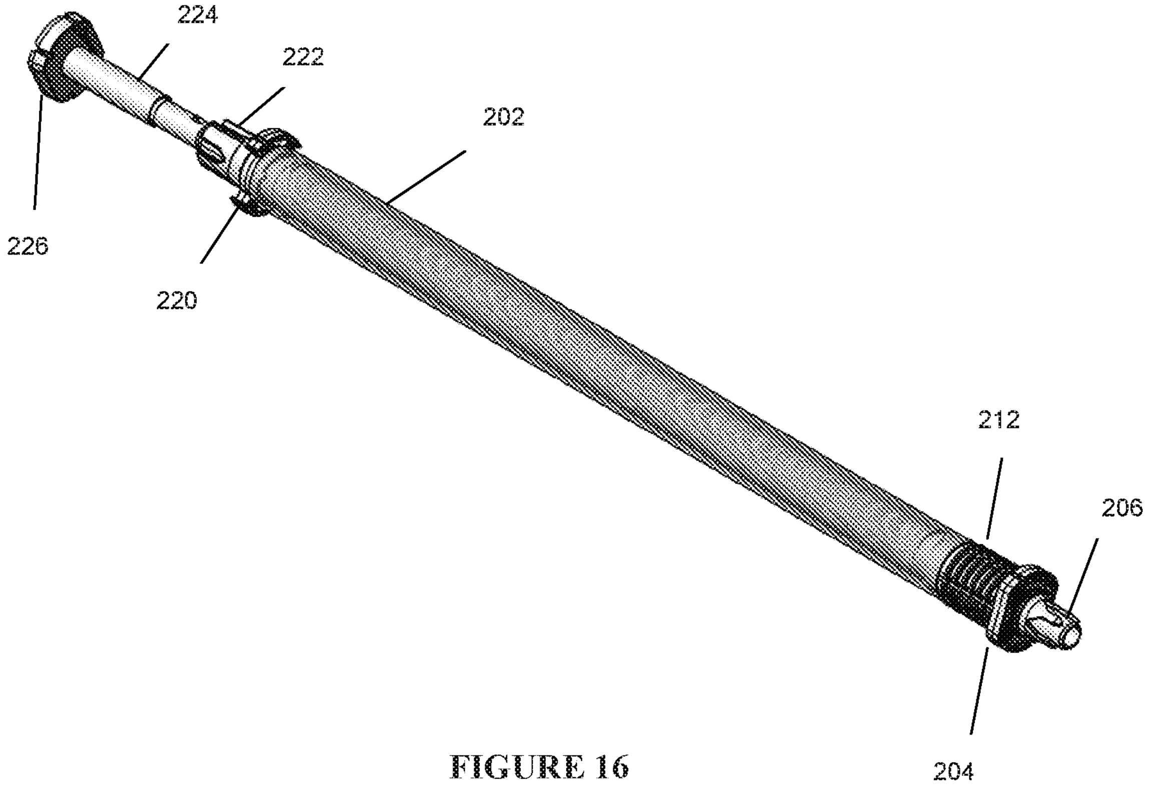
FIG. 16 shows a perspective view of the booster assembly.
Figure 17A:
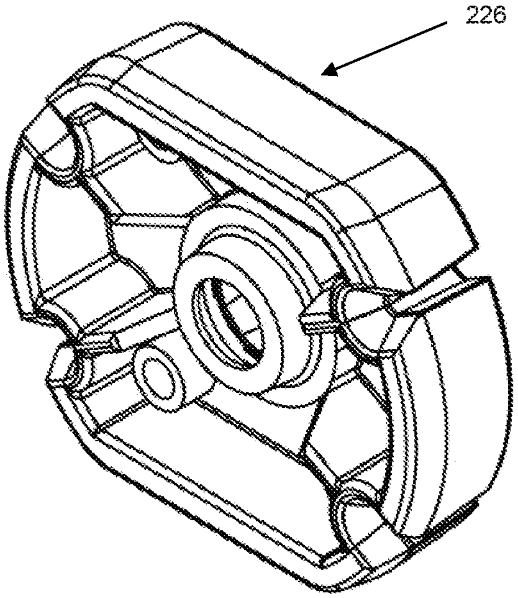
FIGS. 17-22 show details of components of the booster assembly.
Figure 17B:
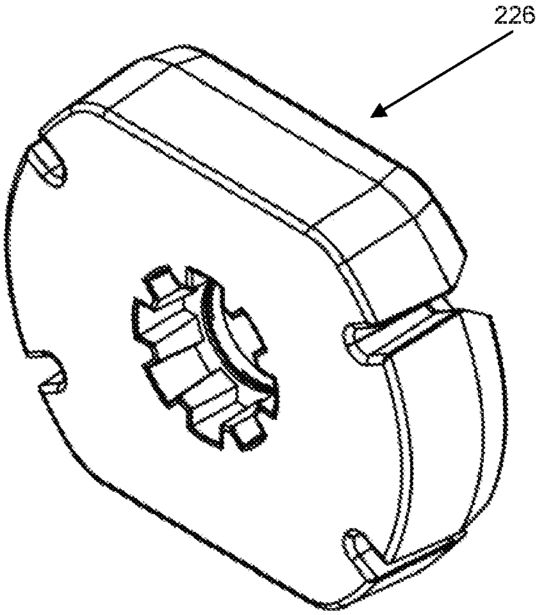
Figure 18:
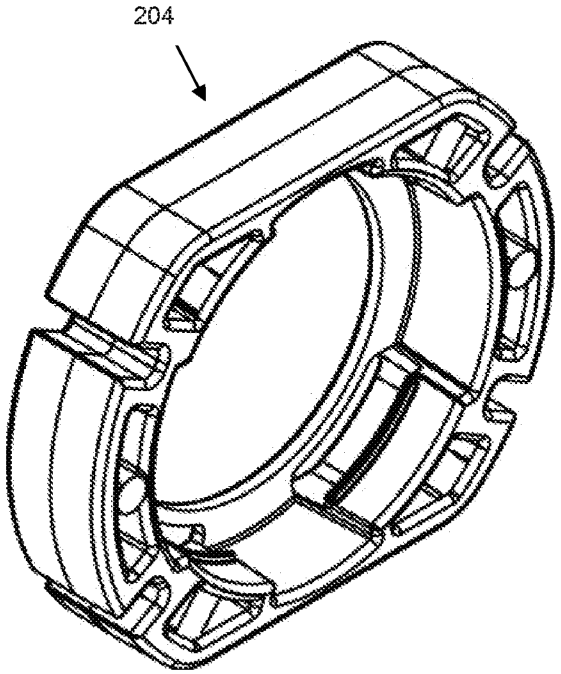
Figure 19:
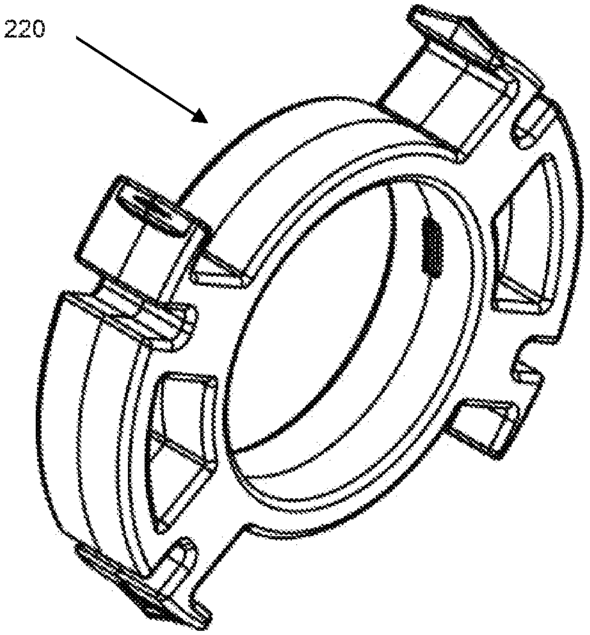
Figure 20:
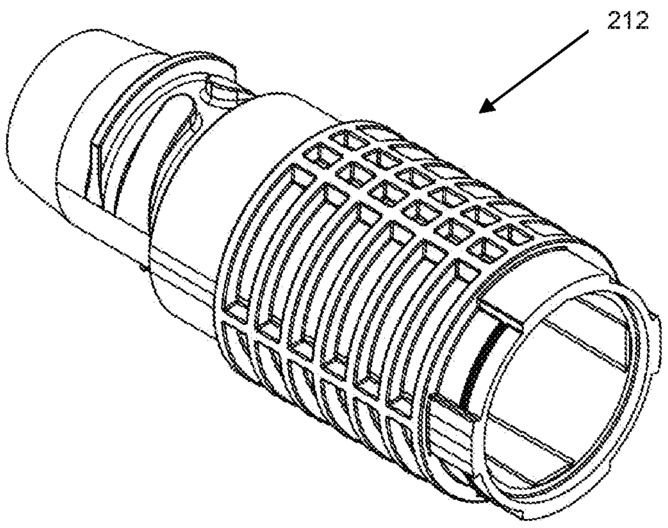
Figure 21:
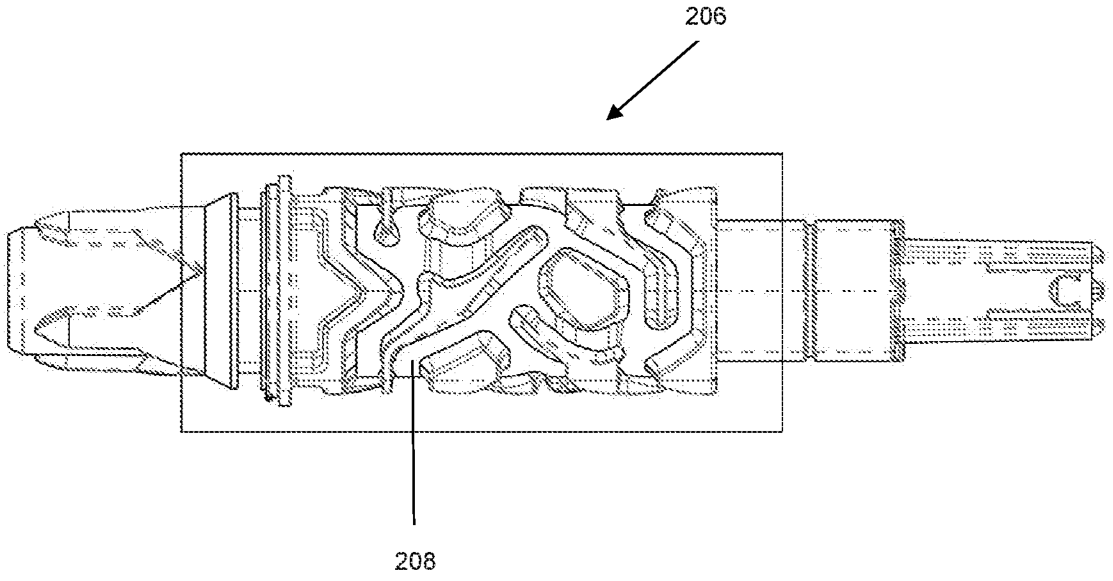
Figure 22:
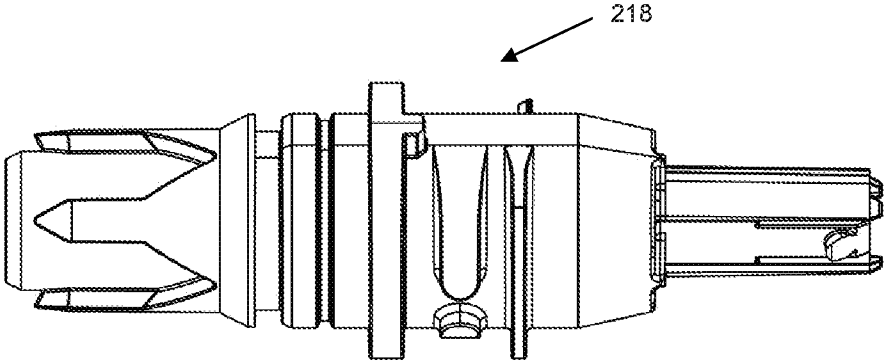

FIG. 16 shows how many of the components of the booster assembly 200 are assembled to each other and fit into the booster outer sleeve 202. It should be noted that most of the components are arranged in the same manner whether the cord 22 is disposed on the right or the left side of the system 10. However, the position of the booster/decelerator adapter 222, the brake or damper 224 and the decelerator adapter 226 are reversed when the cord 22 is on the right side of the system 10 and some minor changes to assembly configurations may be needed as well without departing from the overall invention.

FIGS. 17-22 show details of the components of the booster assembly 200.

Figure 23:
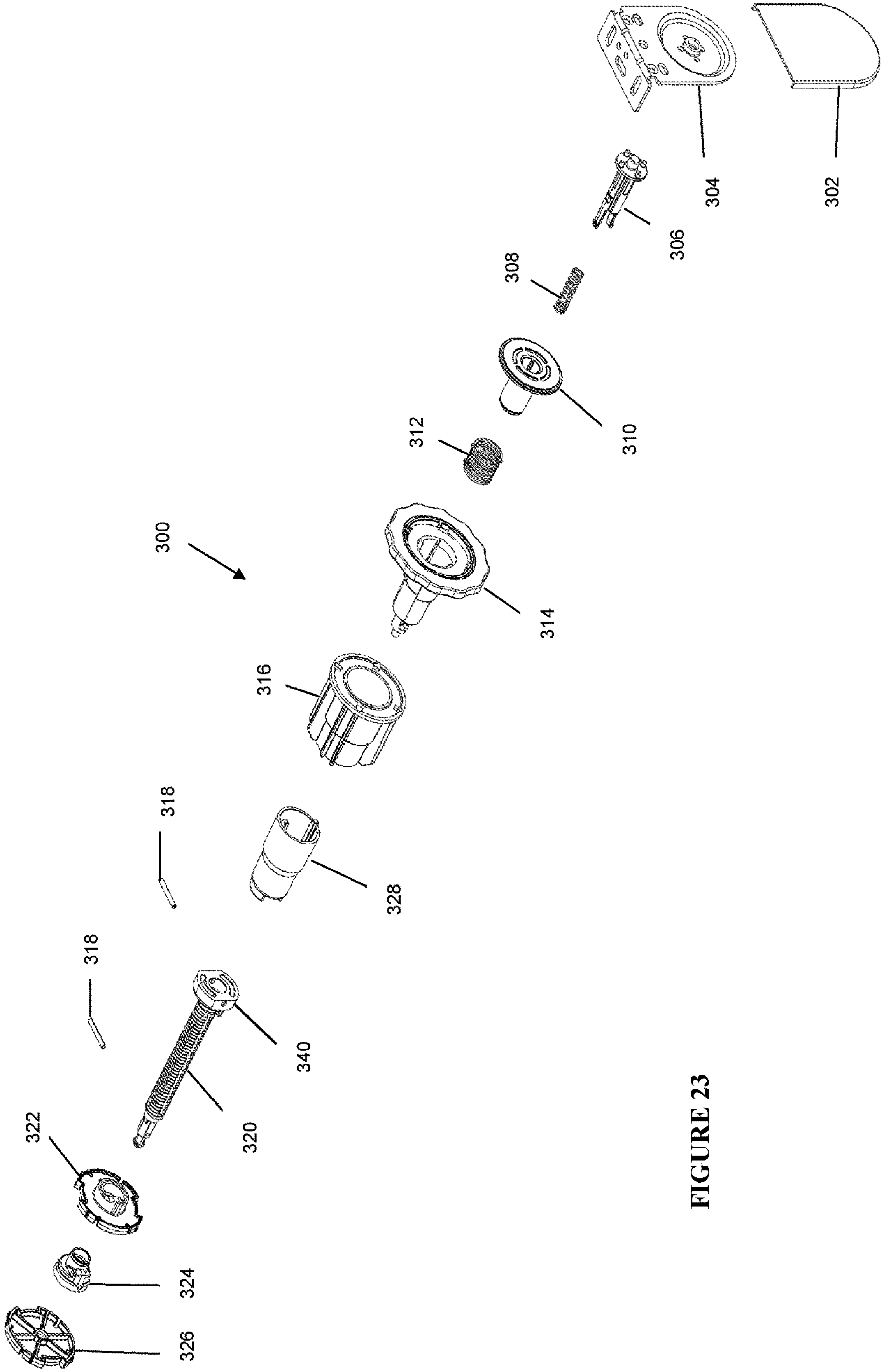
FIG. 23 shows an exploded view of a limiter assembly of the window treatment system of FIG. 1.
Figure 24:
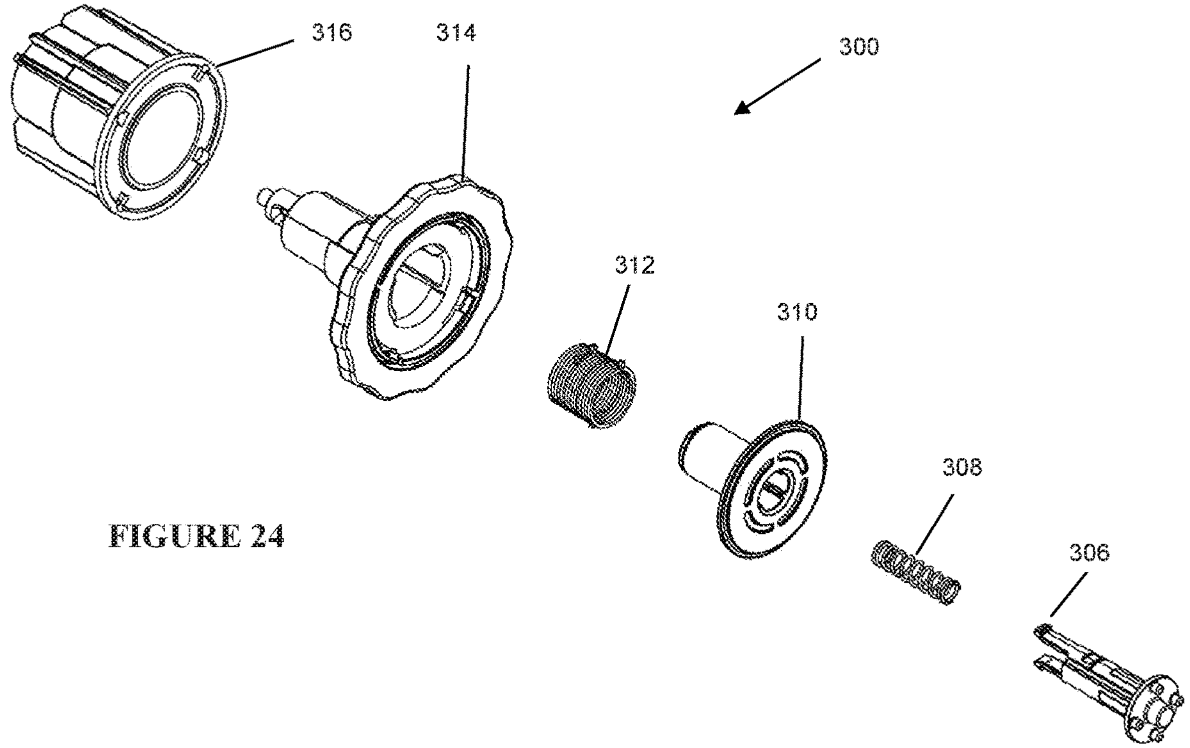
FIG. 24 shows partially exploded views of the limiter assembly.
Figure 25A:
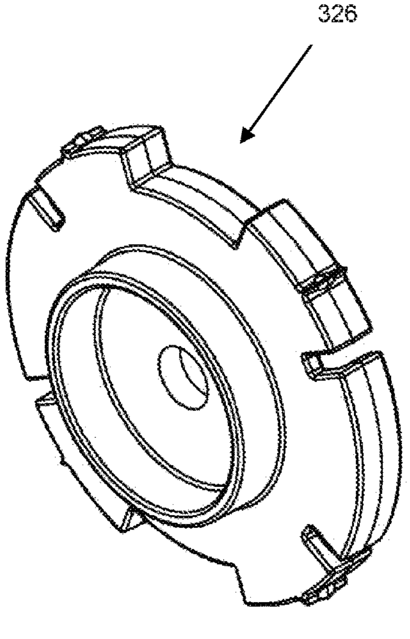
FIGS. 25A-32 show details of the components of the limiter assembly.
Figure 25B:
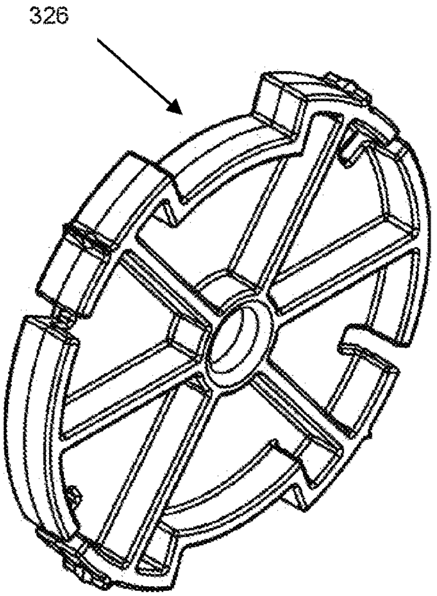
Figure 26:
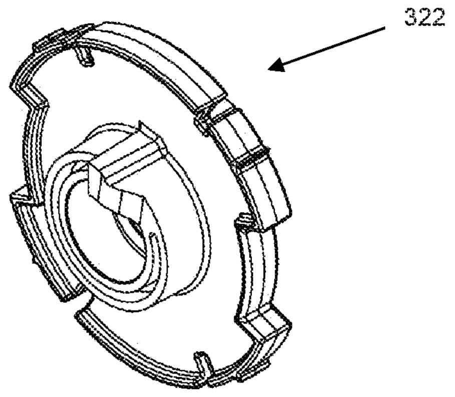
Figure 27A:
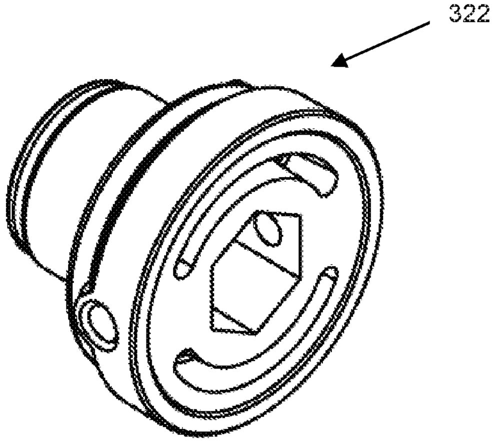
Figure 27B:
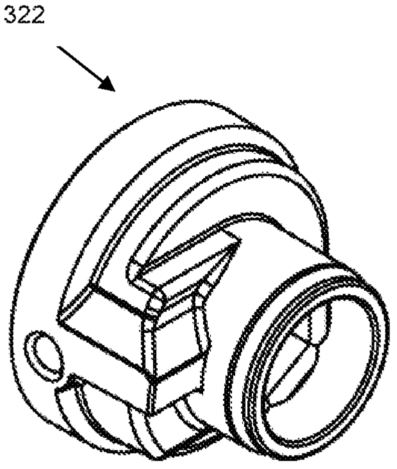
Figure 28:
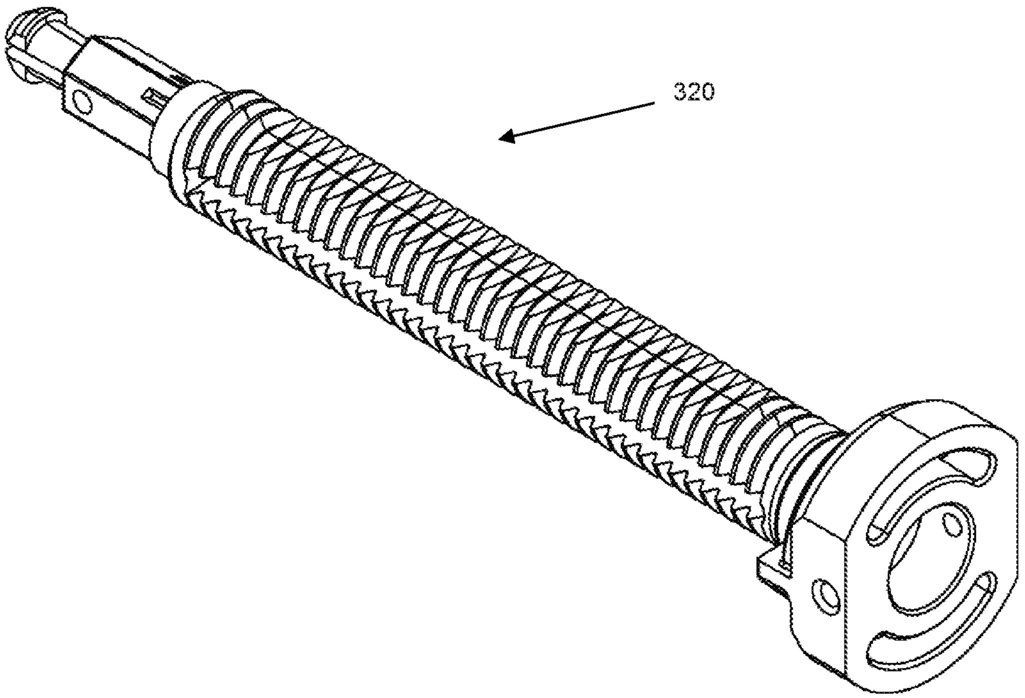
Figure 29:
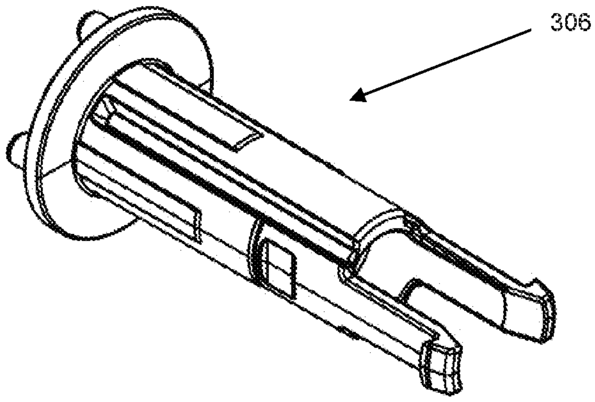
Figure 30:
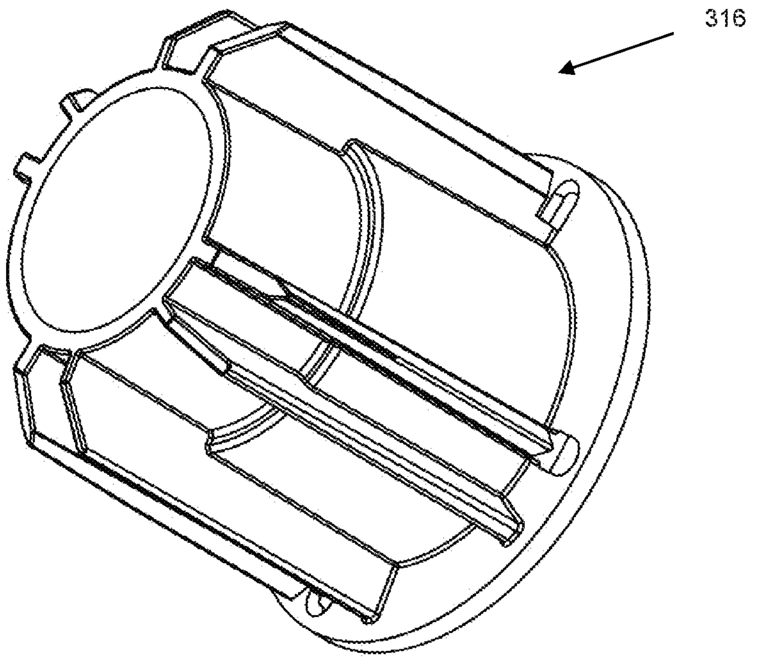
Figure 31:
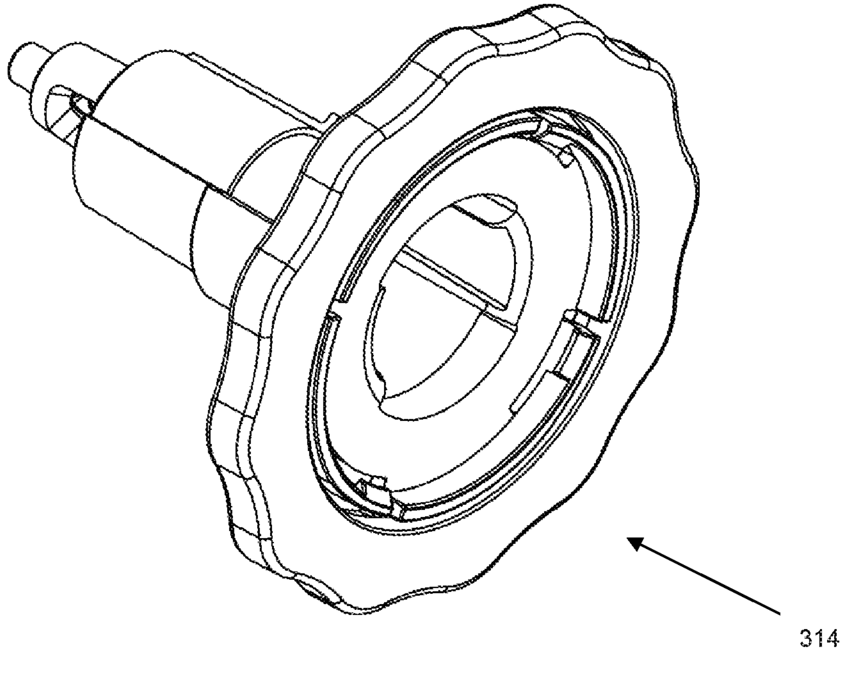
Figure 32:
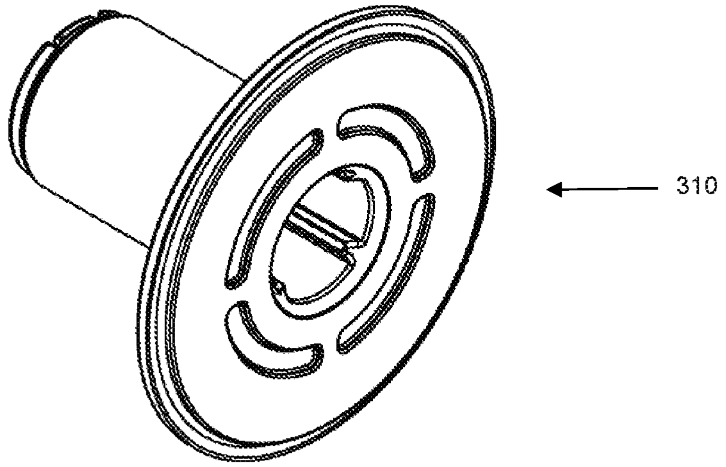

FIGS. 23 and 24 show exploded views of the limiter assembly 300. The limiter assembly includes the following components: a bracket cover 302; a keyed end bracket 304; a retractable pin 306; a compression spring 308; a spring disk 310; limiter wheel springs 312; a thumb wheel 314; a housing 316; spring pins 318; a limiter screw 320; a limiter stop wheel 322; a stop boss 324; an idler wheel 326; and an adjustment wheel sleeve 328. The keyed end bracket 304 can be secured to an end of the window covering 14.

Figure 33:
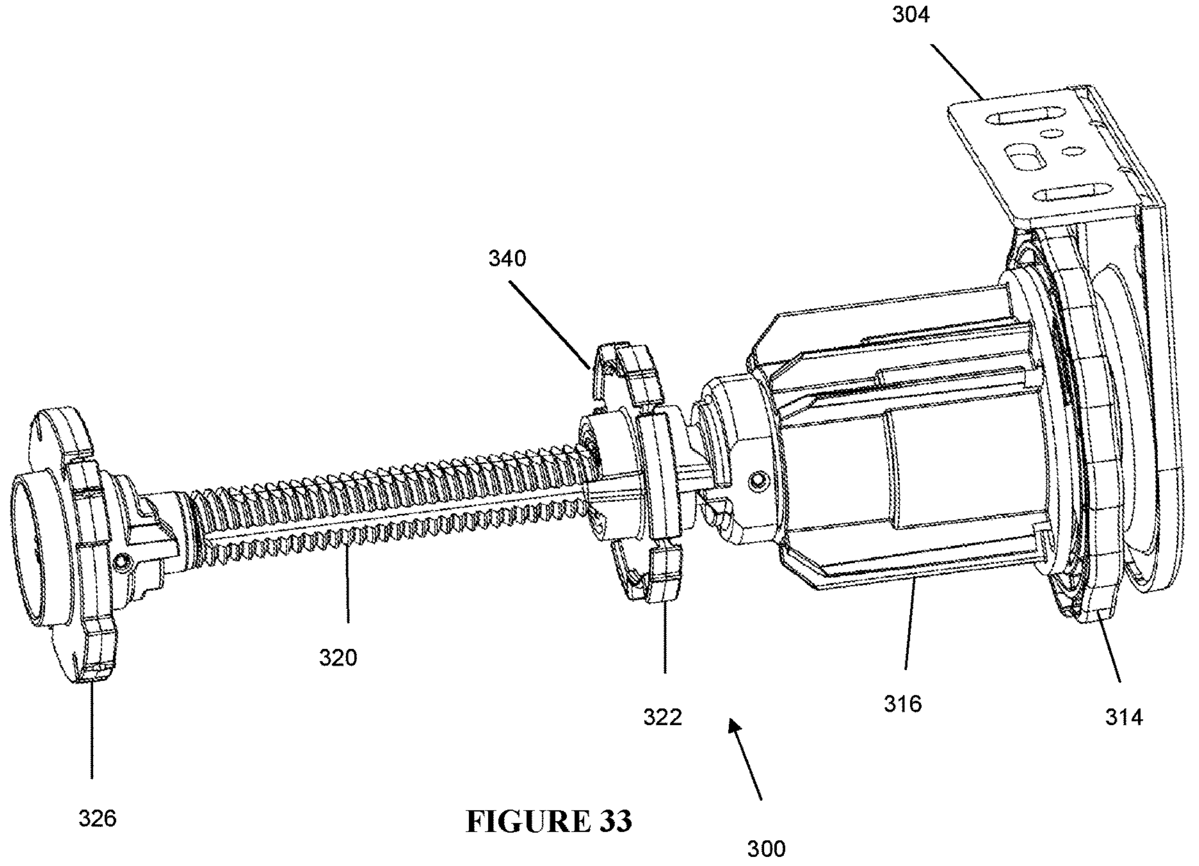
FIG. 33 is a perspective view of the limiter assembly.

FIGS. 25 to 32 show details of the components of the limited assembly 300. FIG. 33 illustrates the limiter assembly 300 in an assembled state.

Figure 34:
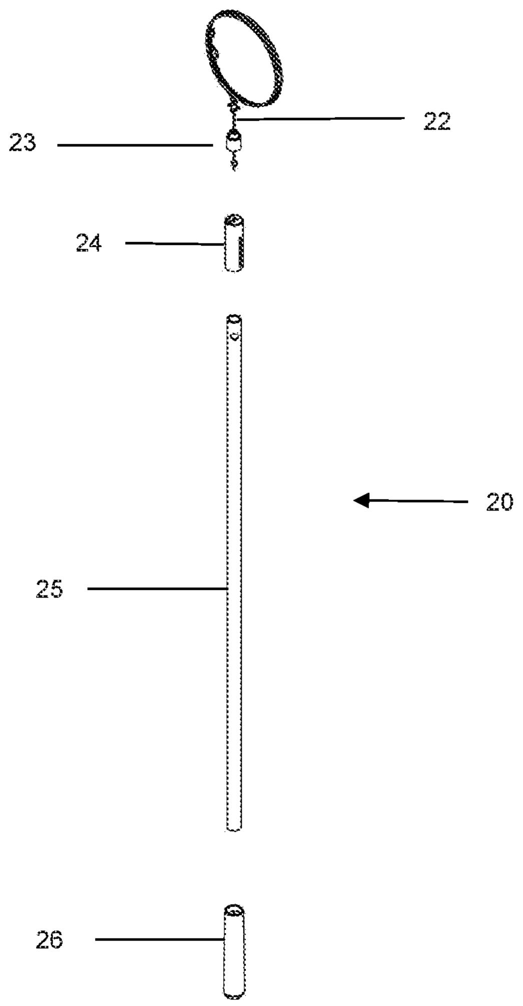
FIG. 34 shows an exploded view of a wand of the window treatment system of FIG. 1.
Figure 35:
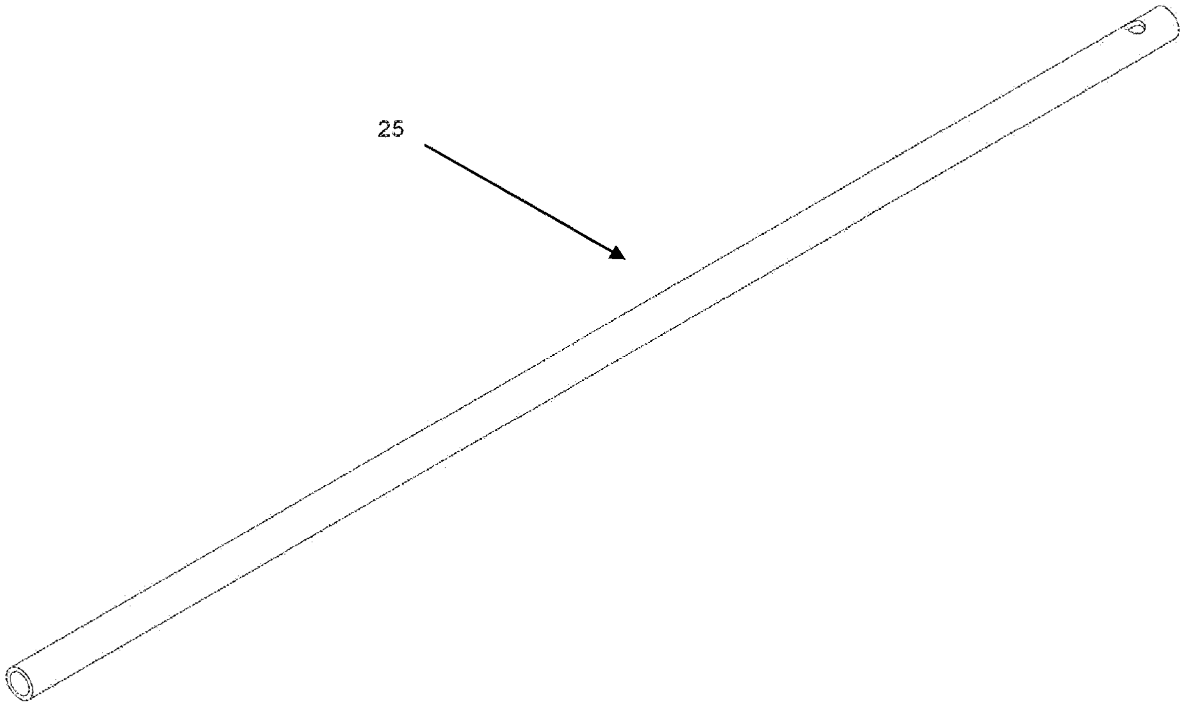
FIGS. 35-38 show details of components of the wand.
Figure 36:
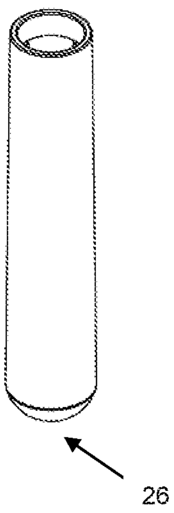
Figure 37:
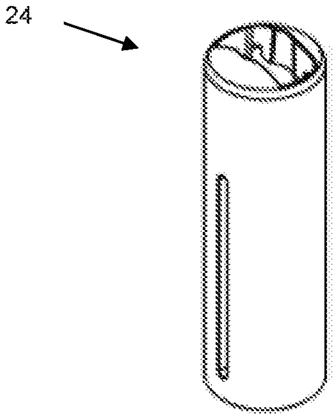
Figure 38:
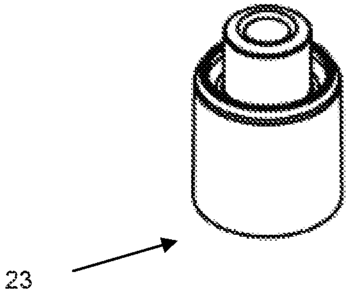

The wand 20 is shown in further detail in FIGS. 34 to 38. The wand 20 engages and encloses the end of cord 22. As shown in FIG. 34, the wand 20 includes top cap inner 23, top cap 24, wand body 25 and bottom cap 26. FIGS. 35 to 38 show details of the components of wand 20.

In the embodiment illustrated at FIGS. 34 to 38, the end of cord 22 passes through top cap inner 23 where it can, for example, terminate with a knot or other means. The inner cap 23 can be fixed within top cap 24, which is then itself fixed to wand body 25, to ensure that the cord 22 cannot be separated from the wand 20. In the illustrated embodiment, the top cap 24 is fixed to the wand body 25 by engaging means on each piece. The wand may also include bottom cap 26, which is an aesthetic cap attached to the end of the wand body 25 distal to the cord 22.

Importantly, at a proximal end of the wand 20, the cord 22 passes through the wand 20 and immediately enters the clutch assembly 100 through an eyelet 108A (FIG. 3) mounted on a bottom surface of the clutch assembly 100. The cord 22 is wound around the pulley 108. The spring 106 and pulley 108 are arranged to pull the cord 22 into the clutch assembly whenever it is released (as discussed below) so that the wand 20 virtually abuts the clutch assembly and the cord 22 is almost invisible (FIG. 14). In this way, the device ensures that the cord 22 is not normally exposed to cause possible injury to a child.

Figure 39:
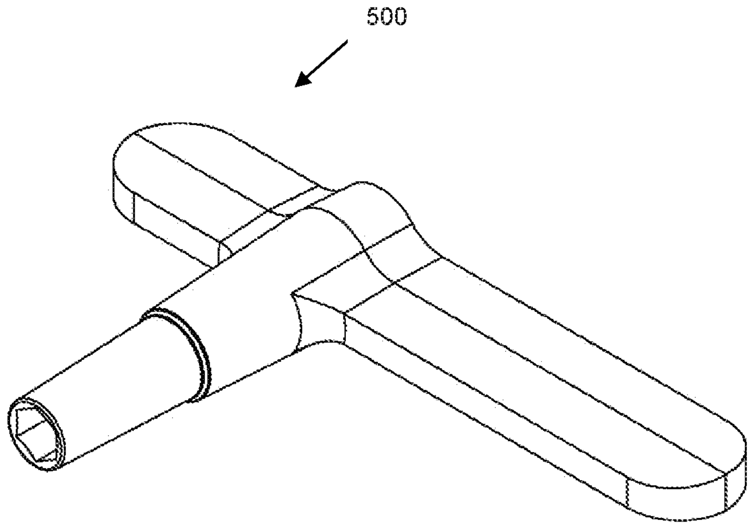
FIG. 39 show a device used to pretension a spring of the booster assembly.

FIG. 39 shows details of a tool 500 used to pre-tension the spring 216 of the booster assembly 200. Initially, the spring 216 is pre-tensioned using the tool 500 at the factory. In addition, the clutch assembly 100 features an adjustment shaft 130 that engages the tool 500 and the clutch inner member 132 to the pre-tension spring 216. Turning the tool in one direction causes the spring 216 to be tightened. Turning the tool 500 in the opposite direction loosens the spring 216.

At the site, the device including the shade rolled up on tube 12 (FIG. 1) is unpacked and prepped for installation, for example, on a wall, a window frame, etc. As part of this process, the limiter assembly is adjusted to set the desired upper position of the window shade (as described below). This is the position at which the window shade moves when it is released from any lower position.

Once the system 10 is installed, it can be readily used to lower or raise the window covering 14 as desired either, manually or using the wand 20. For the purposes of the discussion below, it is assumed that initially the window covering 14 is in its upper position. As the wand 20 pulls on the cord 22 for a short distance (e.g. about ¼ inch), the window covering 14 does not move. The reason for this is that within the clutch assembly 100, the compression spring 120 (FIG. 3) pushes the clutch sleeve 112 and the cam drive dog 114 towards the right and into the core guard cover 110 and clutch pulley 108 (e.g., toward a disengaged position). As the cord 22 is pulled downward and out of the clutch assembly 100, the cord 22 unwinds from clutch pulley 108 and forces the cam drive dog 114 and clutch sleeve 112 to move to the left, against the force of the spring 120. As these parts continue to move axially to the left, they come into contact with the crown 124. Pulling the cord 22 further causes the rotation of clutch pulley 108 to be transmitted to the crown 124 and the crown 124 in turn rotates the drive connector 136. The drive connector 136 is inserted into tube 12 and therefore the rotation of connector 136 causes the tube 12 to rotate, thereby lowering the window covering 14. Depending on several factors, including the length of the window covering 14, the length of cord 22, and the desired lower position of window covering 14, the window covering 14 can be lowered using a single stroke of the wand 20 or multiple up and down strokes. Whenever the tension on the cord 22 is released, the elements discussed above move back to the right, disengaging from the crown 124. Meanwhile the spring 106 retracts the cord 22 back into the clutch assembly 100 and winds it onto the pulley 108.

The rotation of the tube 12 is also transmitted to the booster assembly 200. As previously mentioned, the spring 216 is pre-tensioned and tightened as the tube 12 is rotated to lower the window covering 14. The spring 216 normally provides the force for turning the tube 12, raising window covering 14. The booster system 200 is further adapted to provide damping so that the window covering 14 does not rise too quickly, but instead rises at a substantially constant speed. Finally, the booster system 200 further provides a break that ensures the tube 12 and window covering 14 remain in an intermediate position during the upward stroke of the wand 20.

The position track stop 206 and ball bearing 210 are disposed in the position stop jacket 212. This housing is fixed at the end of booster assembly 200 and it is not allowed to spin freely inside tube 12 because tube adapter 204 is keyed into a fixed position and is inserted into an end of the position of track jacket 212. The other end of jacket 212 engages an end of the booster spring 216 and fixes this spring end so it does not rotate with tube 12. Inside the spring jacket, there is a lateral groove arranged to keep the ball bearing 210 on one of the tracks 208 and stop it from jumping to other tracks.

The position stop track 206 provides a locking function for the booster assembly 200. The tracks 208 and the ball bearing 210 cooperate to form a barrel cam with six paths that define six positions for locking and releasing the booster assembly 200. As the tube 12 rotates, the jacket 212 rotates with the tube 12 and causes the ball bearing 210 to follow one of the tracks 208. When the tube 12 stops, the spring 216 applies a torque on the tube 12, thereby forcing the ball bearing 210 into one of the locking paths 208.

The shaft 214, that can be, for example, comprised of aluminum, is fixed at one end to the position stop track 206 and at the other end to the free head 218 in order to provide structural support for the booster assembly. This aids in forming a rigid assembly capable of handling large forces and torques generated by the booster spring 216.

The free head 218 is attached to the other end of the booster spring 216 and is fixed to the shaft 214. The adapter 220 secures the free head 218 within the tube 12, but prevents it from rotating with tube 12. Thus, the spring 216 is tightened by jacket 212. Jacket 212 rotates with tube 12, which in turn is rotated by connector 136.

It was previously noted that in addition to wand 20, the system 10 can be operated by pulling the window covering 14 down. When the window covering 14 is released, it moves up slightly until the ball bearing 210 is trapped in one of the stop tracks 208, forcing the window covering 14 to stop and remain in position. Pulling the window covering 14 down slightly causes the ball bearing 210 to disengage and when the window covering 14 is then released, it is free to move up and roll onto tube 12 under the influence of spring 216.

The damper or brake 224 provides damping to tube 12 so that it does not spin uncontrollably when the shade 14, is released either directly or by wand 20, and allowed to move up and wind onto tube 12.

Details of the limiter assembly 300 are shown in FIG. 23. Idler 326 and wheel 322 are connected to screw 320 and both support and are rotated by tube 12. The idler 326 is free to rotate on the end of the screw 320. Wheel 322 is engaged by the screw 320 so that as the shade goes up and down, as discussed above, the wheel 322 moves laterally along the threads of screw 320. Initially, the screw 320 and wheel 322 are arranged so that when the shade is in its lowest position, the screw 320 is in its left most position (in the orientation shown in FIG. 33) adjacent to the idler 326. As the shade is moved up, the wheel 322 moves to the right toward the end 340 of screw 320. The end 340 and the wheel 322 are configured so that when the wheel 322 reaches the end 340, they engage each other, and the wheel 322 stops rotating, thereby providing an effective stop for the shade. In other words, when the wheel 322 reaches the end 340, the window covering 14 can no longer move upwards. The thumb wheel 314 is mechanically coupled to the screw 320 so that rotating the thumbwheel 314 causes the screw 320 to rotate as well. As explained above, in the specific orientation shown in FIGS. 33, the end 340 is the end of screw 320 that is immediately adjacent to housing 316. However, depending on how the item is installed, and whether the fabric is installed to come off the tube behind the roll (as opposed to in front), the end 340 could refer to the other end of screw 320 (that is, the end of screw 320 closest to idler wheel 326).

The purpose of the limiter assembly 300 is to allow an operator to select the position of the window covering 14 beyond which the window covering 14 does not move. This is accomplished as follows. First, the operator moves the window covering 14 to the desired position. As previously discussed, as the window covering 14 moves up, wheel 322 moves to the right, along screw 320 towards end 340. When the operator stops the window covering 14 at a desired upper height H0 (see FIG. 1), the wheel 322 reaches a position X along screw 320. At this point, the operator turns thumbwheel 314 causing the screw 320 to advance to the left through wheel 322 until end 340 reaches and engages the wheel 322 (See FIG. 2). In this manner the upper limit H0 has been set. Of course, next time the window covering 14 is lowered to its lower limit, the wheel 322 again travels to the left along screw 322, but it no longer reaches the idler 326.

FIGS. 40A-40B show an alternate embodiment of the cord guard 400. This cord guard 400 includes a housing 402 with two holes 404, 406. The holes 404, 406 are disposed in a wall of the housing 402 such that they are not horizontal, but rather are offset by an angle that aligns with the direction of cord as the wand 20 is pulled. This angle may be about 20 degrees. Two rings or eyelets 108A (shown in FIG. 9) may are disposed in the holes 404, 406. The cord 22 operating the window covering 14 is wound within the guard 400 and passes through hole 404 when the window covering 14 is set for a right handed operation and through hole 406 when set for a left handed operation. A blanking plug 108B may be placed in hole 404 and hole 406 when the window covering is set for left and right handed operation, respectively, to cover the hole.

This configuration has several advantages. As the cord 22 is pulled successively through one of the respective holes, the friction between the cord 22 and the respective hole is reduced substantially. Therefore, the window covering 14 is easy to operate. In addition, because of this reduced frictional force, the cord 22 resists fraying or breaking. In the first embodiment shown, for example, in FIG. 11B, the hole 108X for the cord 22 is in a central position in order to allow the cord guard 102 to be used in either left or right-sided operation. This bilateral symmetry is maintained in the present embodiment by providing an area for an eyelet to be inserted in either or both of holes 404, 406.

For both embodiments discussed above for the cord guard 102, the spring 106 shown in detail in FIG. 4 is formed with two U-shaped ends 106*a*, 106*b*. The spring 106 is disposed in the core guard in a manner such that end 106*a* engages a slot 410 (see FIG. 11B) in the central stationary boss 104 (See FIG. 3).

The other end 106*b* of the spring 106 is engaged in a slot 108Z of pulley 108 (see FIGS. 6-7). (Slots 108XX and 108YY shown in FIG. 6 are used to hold the end of the cord 22, one slot being used in the right-side configuration and the other for the left side configuration). Significantly, the slots for holding the ends of the spring 106 are shaped so that the spring 106 can be mounted for either operation.

As discussed above, in order to raise the window covering 14, the cord 22 is pulled down. This motion causes the pulley 108 to rotate. Because the spring 106 is disposed between the stationary boss 104 and the pulley 108, as the pulley 108 is rotated by the cord 22, the pulley 108 rotates an end of the power spring 106, causing the power spring 106 to tighten. When the cord 22 is released, the power spring 106 causes the pulley to reverse direction and rotate in the other direction, thereby pulling the cord 22 back into the cord guard 102.

Importantly, the elements of the clutch assembly 100 and the cord guard 102 are arranged and constructed to define a space for spring 106 in such a way that the spring 106 does not come into contact or rest on any sharp edges, indentations or slots. Rather, the spring 106 only lies on or comes in contact with smooth rounded surfaces on the pulley 108 and the cord guard 102. It has been found that any discontinuities could cause the spring 106 to bend with a small radius of curvature or force the coil to twist and distort. Any such bending and distortion of the coil can result in metal fatigue in the spring 106 and, after repeated operations, the spring 106 can break at the bending or distortion points. In the present device, these problems are substantially avoided or reduced, thereby increasing the useful life of the spring 106 and hence the whole system 10.

In summary, the above-described system 10 has numerous advantages over other devices known in the art.

For example, because of the arrangement and structure of its components, the system 10 is slimmer and results in a smaller light gap between the system 10 and the supporting surface.

The system 10 requires a lower pull force to operate, especially under low or no load conditions.

The exit point of the cord 22 from the guard 102 is formed by an eyelet 108A or eyelets that not only presents a low coefficient of friction, but is/are oriented to align more accurately with the cord 22 as the cord 22 is pulled in and out of the core guard 102. This design reduces the contact surface area, as well as reduces frictional force, thereby reducing the operational force required to raise the window covering 14. Moreover, abrasion on the cord 22 is also reduced, thereby increasing its useful life.

The system 10 (more specifically clutch assembly 100) is provided with recessed holes for engaging stationary brackets supporting the system 10. This feature further reduces light gaps around the window covering 14.

The spring used to bias the pulley 108 is arranged and supported so that it only experiences and applies radial forces, and does not experience any axial forces or other forces that may distort it.

The system 10 is configured to allow access to the clutch mechanism with an appropriate tool (see FIG. 39). The tool extends through a hole formed in the respective end of the clutch assembly 100 and is used to adjust the booster tension while the system 10 is installed.

The system 10 can be mounted for either right-handed or left-sided operation and for either forward or reverse operation of the window treatment.

The device is provided with an adjustable limiter 300 to set and adjust a top and/or a bottom stop position for the window shade. This adjustable stop position can be set easily using a thumb wheel 314 provided on one side of the device. The thumb wheel 314 can be accessed during or after the installation of the window shade.

The limiter 300 and other components of the device are configured with interlocking members to ensure that the components are snapped together efficiently and securely. The limiter 300 includes a spring loaded element that is configured so that it does not interfere with the installation or removal of the window shade.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. It is to be understood that the phraseology or terminology employed herein is for the purpose of description and not of limitation. In addition, while several variations of the embodiments of the invention have been shown and described in detail, other modifications, which are within the scope of this invention, including, but not limited to, the substitutions of equivalent features, materials, or parts, will be readily apparent to those of skill in the art based upon this disclosure without departing from the spirit and scope of the invention.

What is claimed is:

1. A system for a window covering, comprising:

an elongated tube around which the window covering is able to be wound, the elongate tube being configured to rotate and thereby move the window covering between a retracted position and an extended position;

a clutch assembly disposed at one end of the elongate tube, the clutch assembly comprising:

a pulley;

a power spring, the power spring having a first end engaging the pulley and a second end that is stationary;

a cord arranged at least partially within the clutch assembly, the cord being wound around a perimeter of the pulley; and a wand fixed to the cord to selectively raise and lower the window covering between the retracted position and the extended position;

the pulley being configured to rotate in a first direction when the wand is pulled downwardly, and to rotate in a second direction that is opposite to the first direction on release of the wand, wherein rotation of the pulley in the second direction is configured to draw the wand upwardly and wind the cord around the perimeter of the pulley, and wherein rotation of the pulley in the first direction causes the elongate tube to rotate in the first direction to move the window covering from the retracted position towards the extended position; and a booster assembly disposed and hidden from view within the elongate tube, the booster assembly being configured to move the window covering from the extended position towards the retracted position, the booster assembly comprising:

a shaft, a booster spring disposed around the shaft, the booster spring being configured to apply a rotational force on the elongate tube to move the window covering from the extended position towards the retracted position, a tube adapter disposed at a first end of the shaft, the tube adapter being engaged with the elongate tube, a damper disposed at a second end of the shaft, the damper being configured to provide damping to the elongate tube when the window covering moves from the extended position towards the retracted position, a position stop jacket engaging a first end of the booster spring, and a position stop track member that provides a locking function for the booster assembly, the position stop track member being disposed in the position stop jacket, the position stop track member comprising a plurality of tracks and a ball bearing disposed in the tracks of the stop track member, the tracks and the ball bearing being configured to cooperate to form a barrel cam, the tracks comprising a plurality of positions for locking the booster assembly and a plurality of positions for releasing the booster assembly.

2. The system of claim 1 wherein the rotation of the pulley in the second direction pulls the wand upward until it contacts the clutch assembly.

3. The system according to claim 1, wherein the clutch assembly further includes a guard that, in an assembled state with the pulley, forms at least one cavity, and in the cavity, the cord and the power spring are arranged.

4. The system of claim 3 in which the power spring has a tab at either end of the coil, and the guard includes a slot in which a tab of the power spring is engaged.

5. The system according to claim 3, wherein the guard includes an opening, and the clutch assembly further comprises an eyelet disposed within the opening and wherein the cord is configured to extend through the eyelet and the opening.

6. The system according to claim 5, wherein the cavity between the guard and the pulley defines a path for movement of the cord between a retracted position and an extended position through the eyelet.

7. The system according to claim 5, wherein the eyelet is angled within the guard with respect to a path of movement of the cord to reduce wear on the cord.

8. The system according to claim 3, wherein the guard has a bottom wall that includes a first opening and a second opening, and the clutch assembly further comprises a first eyelet disposed in the first opening and a second eyelet disposed in the second opening with the eyelets disposed at different respective angles, wherein the cord extends through the first eyelet when the window covering system is configured for right-handed operation and the cord extends through the second eyelet when the window covering system is configured for left-handed operation.

9. The system according to claim 3, wherein the guard has a bottom wall that includes a first opening and a second opening, and the clutch assembly further comprises either a first eyelet disposed in the first opening or a second eyelet disposed in the second opening with the eyelets disposed at different respective angles, wherein the cord extends through the first eyelet when the window covering system is configured for right-handed operation and the cord extends through the second eyelet when the window covering system is configured for left-handed operation.

10. The system according to claim 1, further comprising a limiter assembly, wherein the limiter assembly is configured to set at least a first position that represents a fully retracted position of the window covering.

11. The system according to claim 10, further comprising a stop to prevent the window covering from further raising once it reaches a predetermined upper position.

12. The system according to claim 1, wherein the booster spring is a pre-tensioned spring configured to provide a force for movement of the window covering.

13. The system according to claim 11, further comprising a wheel coupled to and rotatable with the window covering, wherein the stop is a threaded screw and the wheel travels axially along the threaded screw as the threaded screw is rotated until the travelling wheel reaches and abuts the stop of the threaded screw when the window covering reaches a predetermined upper position.

14. The system according to claim 13, wherein the limiter assembly further comprises an engaging means to manually define the predetermined upper position.

15. The system according to claim 14, wherein the engaging means is a thumb wheel coupled to the threaded screw for manually defining the predetermined upper position by selectively turning the threaded screw.

* * * * *